US010967356B1

(12) United States Patent
Malik et al.

(10) Patent No.: US 10,967,356 B1
(45) Date of Patent: Apr. 6, 2021

(54) DUAL LIGAND SOL-GEL SORBENT COMBINING SUPERHYDROPHOBICITY AND π-π INTERACTION

(71) Applicants: Abdul Malik, Tampa, FL (US); Emre Seyyal, Tampa, FL (US)

(72) Inventors: Abdul Malik, Tampa, FL (US); Emre Seyyal, Tampa, FL (US)

(73) Assignee: University of South Florida, Tampa, FL (US)

( * ) Notice: Subject to any disclaimer, the term of this patent is extended or adjusted under 35 U.S.C. 154(b) by 620 days.

(21) Appl. No.: 15/813,799

(22) Filed: Nov. 15, 2017

Related U.S. Application Data

(60) Provisional application No. 62/422,417, filed on Nov. 15, 2016.

(51) Int. Cl.
| | |
|---|---|
| *C08G 77/08* | (2006.01) |
| *B01J 20/10* | (2006.01) |
| *B01J 20/04* | (2006.01) |
| *C01B 33/10* | (2006.01) |
| *B01J 20/32* | (2006.01) |
| *C01B 33/152* | (2006.01) |
| *C01D 1/04* | (2006.01) |
| *B01J 20/281* | (2006.01) |
| *B01J 20/28* | (2006.01) |
| *C08G 77/24* | (2006.01) |
| *C08G 79/00* | (2006.01) |

(52) U.S. Cl.
CPC ........... *B01J 20/103* (2013.01); *B01J 20/046* (2013.01); *B01J 20/281* (2013.01); *B01J 20/28023* (2013.01); *B01J 20/3204* (2013.01); *B01J 20/3206* (2013.01); *B01J 20/3217* (2013.01); *B01J 20/3293* (2013.01); *C01B 33/10* (2013.01); *C01B 33/152* (2013.01); *C01D 1/04* (2013.01); *B01J 20/3242* (2013.01); *B01J 20/3265* (2013.01); *C08G 77/08* (2013.01); *C08G 77/24* (2013.01); *C08G 79/00* (2013.01)

(58) Field of Classification Search
CPC ........ C08G 77/08; C08G 77/24; C08G 79/00; B01J 20/3265; B01J 20/3242; B01J 20/103
See application file for complete search history.

(56) References Cited

U.S. PATENT DOCUMENTS

| | | | | |
|---|---|---|---|---|
| 7,329,715 B2 * | 2/2008 | Wang | ................... | C08G 77/045 106/287.11 |
| 2003/0027020 A1 * | 2/2003 | Berg | ..................... | C23C 18/122 428/702 |
| 2010/0330505 A1 * | 12/2010 | Nakajima | .............. | C08G 77/26 430/313 |
| 2013/0004137 A1 * | 1/2013 | Jin | ........................ | C08G 77/24 385/144 |

OTHER PUBLICATIONS

S.L. Chong, D.X. Wang, J.D. Hayes, B.W. Wilhite, A. Malik, Sol-gel coating technology for the preparation of solid-phase microextraction fibers of enhanced thermal stability, Anal. Chem., 69 (1997) 3889-3898.
S.S. Segro, A. Malik, Solvent-resistant sol-gel polydimethyldiphenylsiloxane coating for on-line hyphenation of capillary microextraction with high-performance liquid chromatography, J. Chromatogr. A, 1205 (2008) 26-35.
S.S. Segro, A. Malik, Sol-gel methyl coating in capillary microextraction hyphenated on-line with high-performance liquid chromatography—Counterintuitive extraction behavior for polar analytes, J. Chromatogr. A, 1200 (2008) 62-71.
S.S. Segro, A. Malik, High-temperature solvent stability of sol-gel germania triblock polymer coatings in capillary microextraction on-line coupled to high-performance liquid chromatography, J. Chromatogr. A, 1217 (2010) 5746-5752.
S.S. Segro, M.P. Tran, S. Kesani, A. Alhendal, E.B. Turner, A. Malik, Sol-gel microextraction phases for sample preconcentration in chromatographic analysis, J. Sep. Sci., 33 (2010) 3075-3096.
S.S. Segro, J. Triplett, A. Malik, Sol-Gel Germania Triblock Polymer Coatings of Exceptional pH Stability in Capillary Microextraction Online-Coupled to High-Performance Liquid Chromatography, Anal. Chem., 82 (2010) 4107-4113.
S. Bigham, J. Medlar, A. Kabir, C. Shende, A. Alli, A. Malik, Sol-gel capillary microextraction, Anal. Chem., 74 (2002) 752-761.
Eisert 1997; A. Kabir, C. Hamlet, A. Malik, Parts per quadrillion level ultra-trace determination of polar and nonpolar compounds via solvent-free capillary microextraction on surface-bonded sol-gel polytetrahydrofuran coating and gas chromatography—flame ionization detection, J. Chromatogr. A, 1047 (2004) 1-13.
Kabir, C. Hamlet, K. Soo Yoo, G.R. Newkome, A. Malik, Capillary microextraction on sol-gel dendrimer coatings, J. Chromatogr. A, 1034 (2004) 1-11.
X. Li, Z. Zeng, J. Zhou, High thermal-stable sol-gel-coated calix [4] arene fiber for solid-phase microextraction of chlorophenols, Anal. Chim. Acta, 509 (2004) 27-37.
S.S. Segro, A. Malik, Sol-gel coatings with covalently attached methyl, octyl, and octadecyl ligands for capillary microextraction. Effects of alkyl chain length and sol-gel precursor concentration on extraction behavior, J. Chromatogr. A, 1216 (2009) 7677-7686.
S. Kulkarni, L. Fang, K. Alhooshani, A. Malik, Sol-gel immobilized cyano-polydimethylsiloxane coating for capillary microextraction of aqueous trace analytes ranging from polycyclic aromatic hydrocarbons to free fatty acids, J. Chromatogr. A, 1124 (2006) 205-216.
A.M. Shearrow, S. Bhansali, A. Malik, Ionic liquid-mediated bis[(3-methyldimethoxysilyl)propyl] polypropylene oxide-based polar sol-gel coatings for capillary microextraction, J. Chromatogr. A, 1216 (2009) 6349-6355.
A.M. Shearrow, G.A. Harris, L. Fang, P.K. Sekhar, L.T. Nguyen, E.B. Turner, S. Bhansali, A. Malik, Ionic liquid-mediated sol-gel coatings for capillary microextraction, J. Chromatogr. A, 1216 (2009) 5449-5458.

(Continued)

*Primary Examiner* — Margaret G Moore
(74) *Attorney, Agent, or Firm* — Michele L. Lawson; Smith & Hopen, P.A.

(57) ABSTRACT

A dual ligand sol-gel sorbent and method of manufacture is provided herein. The dual ligand sol-gel sorbent provides superior enrichment effects through simultaneous exploitation of superhydrophobicity of one of the ligands and the ability of the other ligand to undergo π-π interaction with hydrophobic aromatic analytes. Sorbent performance is enhanced both in terms of analyte enrichment and sorbent stability, such as pH stability and solvent stability.

13 Claims, 17 Drawing Sheets

(56) References Cited

OTHER PUBLICATIONS

X. Zhou, X. Shao, J.-j. Shu, M.-m. Liu, H.-l. Liu, X.-h. Feng, F. Liu, Thermally stable ionic liquid-based sol-gel coating for ultrasonic extraction—solid-phase microextraction—gas chromatography determination of phthalate esters in agricultural plastic films, Talanta, 89 (2012) 129-135.

L. Yun, High extraction efficiency solid-phase microextraction fibers coated with open crown ether stationary phase using sol-gel technique, Anal. Chim. Acta, 486 (2003) 63-72.

X. Zhou, P.-f. Xie, J. Wang, B.-b. Zhang, M.-m. Liu, H.-l. Liu, X.-h. Feng, Preparation and characterization of novel crown ether functionalized ionic liquid-based solid-phase microextraction coatings by sol-gel technology, J. Chromatogr. A, 1218 (2011) 3571-3580.

J.-W. Li, Y.-L. Wang, S. Yan, X.-J. Li, S.-Y. Pan, Molecularly imprinted calixarene fiber for solid-phase microextraction of four organophosphorous pesticides in fruits, Food Chem., 192 (2016) 260-267.

M.M. Moein, M. Javanbakht, M. Karimi, B. Akbari-Adergani, M. Abdel-Rehim, Three-phase molecularly imprinted sol-gel based hollow fiber liquid-phase microextraction combined with liquid chromatography—tandem mass spectrometry for enrichment and selective determination of a tentative lung cancer biomarker, J. Chromatogr. B, 995 (2015) 38-45.

A. Sarafraz-Yazdi, N. Razavi, Application of molecularly-imprinted polymers in solid-phase microextraction techniques, Trac-Trend Anal. Chem., 73 (2015) 81-90.

Y.L. Wang, Y.-L. Gao, P.-P. Wang, H. Shang, S.-Y. Pan, X.-J. Li, Sol-gel molecularly imprinted polymer for selective solid phase microextraction of organophosphorous pesticides, Talanta, 115 (2013) 920-927.

H. Bagheri, Z. Ayazi, A. Aghakhani, A novel needle trap sorbent based on carbon nanotube-sol-gel for microextraction of polycyclic aromatic hydrocarbons from aquatic media, Anal. Chim. Acta, 683 (2011) 212-220.

A Sarafraz-Yazdi, A. Amiri, G. Rounaghi, H.E. Hosseini, A novel solid-phase microextraction using coated fiber based sol-gel technique using poly (ethylene glycol) grafted multi-walled carbon nanotubes for determination of benzene, toluene, ethylbenzene and o-xylene in water samples with gas chromatography-flam ionization detector, J. Chromatogr. A, 1218 (2011) 5757-5764.

Z. Tang, Y. Liu, Y. Duan, Development of solid-phase microextraction fibers based on multi-walled carbon nanotubes for preconcentration and analysis of alkanes in human breath, J. Chromatogr. A, 1425 (2015) 34-41.

H. Kataoka, Automated sample preparation using in-tube solid-phase microextraction and its application—a review, Anal. Bioanal. Chem., 373 (2002) 31-45.

T.Y. Kim, K. Alhooshani, A. Kabir, D.P. Fries, A. Malik, High pH-resistant, surface-bonded sol-gel titania hybrid organic-inorganic coating for effective on-line hyphenation of capillary microextraction (in-tube solid-phase microextraction) with high-performance liquid chromatography, J. Chromatogr. A, 1047 (2004) 165-174.

K. Alhooshani, T.-Y. Kim, A. Kabir, A. Malik, Sol-gel approach to in situ creation of high pH-resistant surface-bonded organic-inorganic hybrid zirconia coating for capillary microextraction (in-tube SPME), J. Chromatogr. A, 1062 (2005) 1-14.

L. Fang, S. Kulkarni, K. Alhooshani, A. Malik, Germania-based, sol-gel hybrid organic-inorganic coatings for capillary microextraction and gas chromatography, Anal. Chem., 79 (2007) 9441-9451.

A Kabir, K.G. Furton, A. Malik, Innovations in sol-gel microextraction phases for solvent-free sample preparation in analytical chemistry, Trac-Trend Anal. Chem., 45 (2013) 197-218.

Y. Gao, Y. Huang, S. Feng, G. Gu, F.-L. Qing, Novel superhydrophobic and highly oleophobic PFPE-modified silica nanocomposite, J. Mater. Sci., 45 (2010) 460-466.

A. Alhendal, S. Mengis, J. Matthews, A. Malik, Nonhydrolytic sol-gel approach to facile creation of surface-bonded zirconia organic-inorganic hybrid coatings for sample preparation. I. Capillary microextraction of catecholamine neurotransmitters, J. Chromatogr. A, 1468 (2016) 23-32.

L. Lan, B. Hu, C. Yu, pH-resistant titania hybrid organic-inorganic coating for stir bar sorptive extraction of drugs of abuse in urine samples followed by high performance liquid chromatography—ultraviolet visible detection, J. Chromatogr. A, 1217 (2010) 7003-7009.

A. Sarafraz-Yazdi, Z. Es'haghi, S. Sepehr, Comparative study of the three sol-gel based solid phase microextraction fibers in extraction of BTEX from water samples using gas chromatography-flame ionization detection, Anal. Methods, 2 (2010) 746-752.

A.L. Lopes, F. Augusto, Preparation and characterization of polydimethylsiloxane/poly(vinylalcohol) coated solid phase microextraction fibers using sol-gel technology, J. Chromatogr. A, 1056 (2004) 13-19.

H. Bagheri, H. Piri-Moghadam, P. Bayat, S. Balalaie, Application of sol-gel based molecularly imprinted xerogel for on-line capillary microextraction of fentanyl from urine and plasma samples, Anal. Methods, 5 (2013) 7096-7101.

V. Abbasi, A. Sarafraz-Yazdi, A. Amiri, H. Vatani, Determination of Aromatic Amines Using Solid-Phase Microextraction Based on an Ionic Liquid-Mediated Sol-Gel Technique, J. Chromatogr. Sci., 54 (2016) 677-681.

A. Amiri, F. Ghaemi, Thermally stable carbon nanofibers functionalized with poly (dimethylsiloxane) for solid-phase microextraction of polycyclic aromatic hydrocarbons prior to GC analysis, Microchim. Acta, (2016) 1-8.

A. Amiri, Solid-phase microextraction-based sol-gel technique, Trac-Trend Anal. Chem., 75 (2016) 57-74.

J.D. Hayes, A. Malik, Sol-gel open tubular ODS columns with reversed eleotroosmotic flow for capillary electrochromatography, Anal. Chem., 73 (2001) 987-996.

D.H. Marchand, K. Croes, J.W. Dolan, L.R. Snyder, R.A. Henry, K.M.R. Kallury, S. Waite, P.W. Carr. Column selectivity in reversed-phase liquid chromatography VIII. Phenylalkyl and fluoro-substituted columns. Journal of Chromatography A, 1062 (2005) 65-78.

\* cited by examiner

Hydrolysis of sol-gel precursors

Formation of a Surface-bonded Sol-gel Coating within the Fused Silica Capillary
Evolution of a Sol-gel Network in the Sol Solution within the Capillary
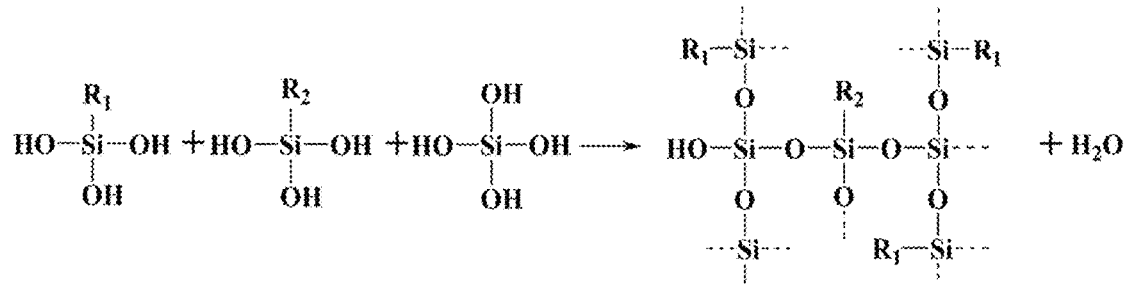
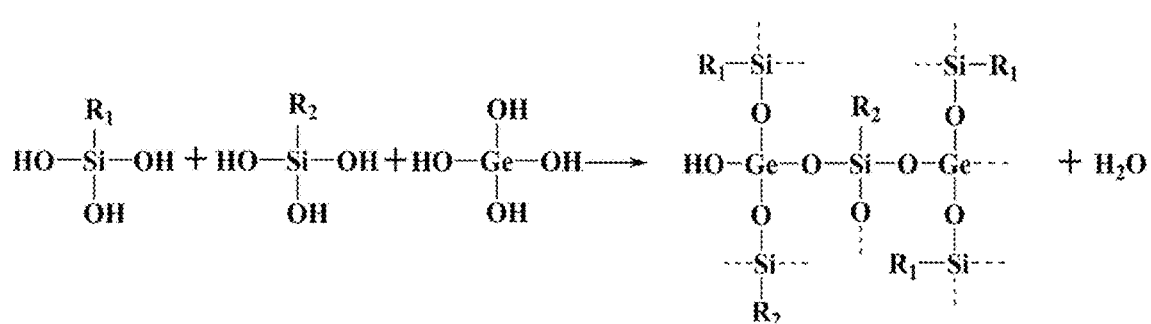
Chemical Anchoring of the Evolving Sol-gel Network to the Capillary Inner Surface
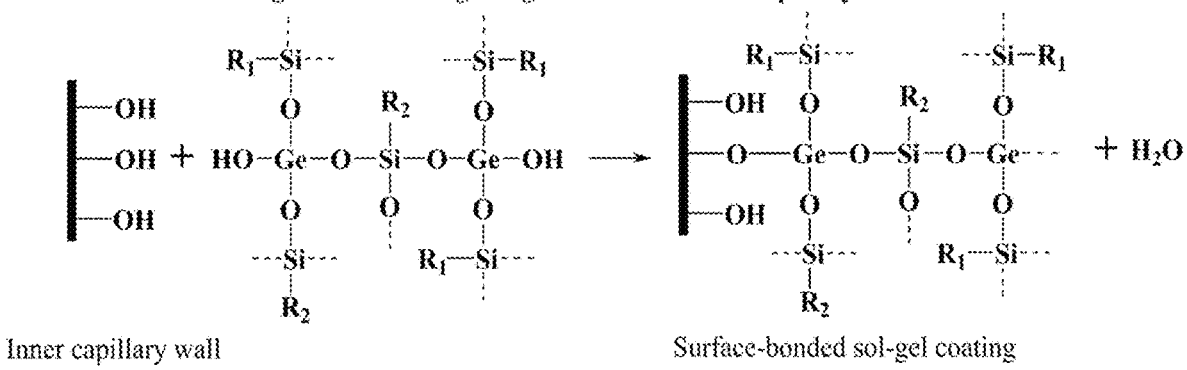
Inner capillary wall          Surface-bonded sol-gel coating
Figure 1B

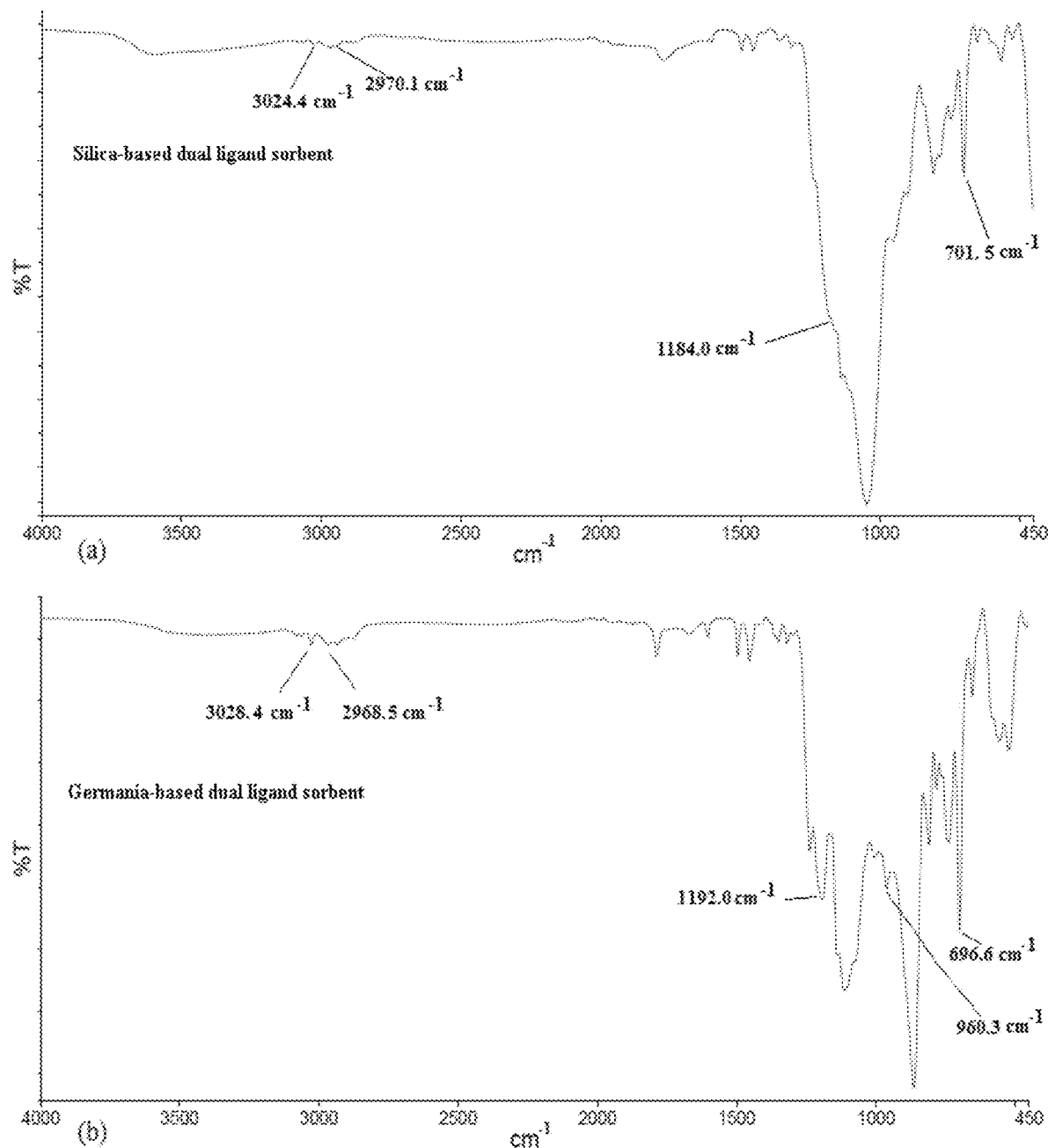
Figure 3A-B

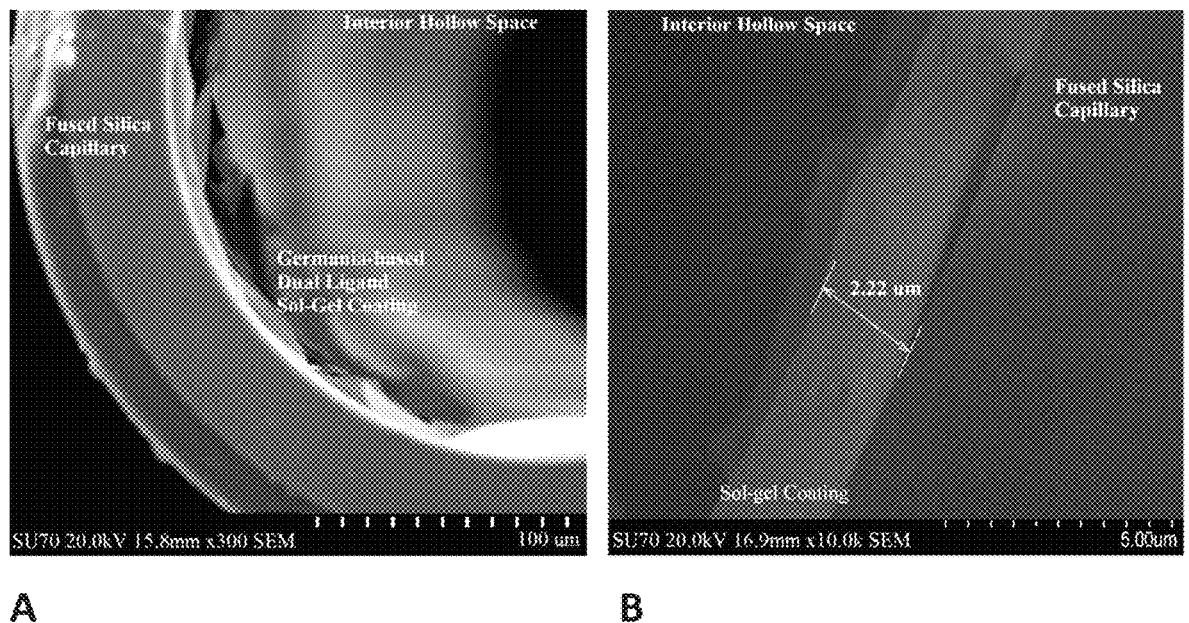
Figure 4A-B

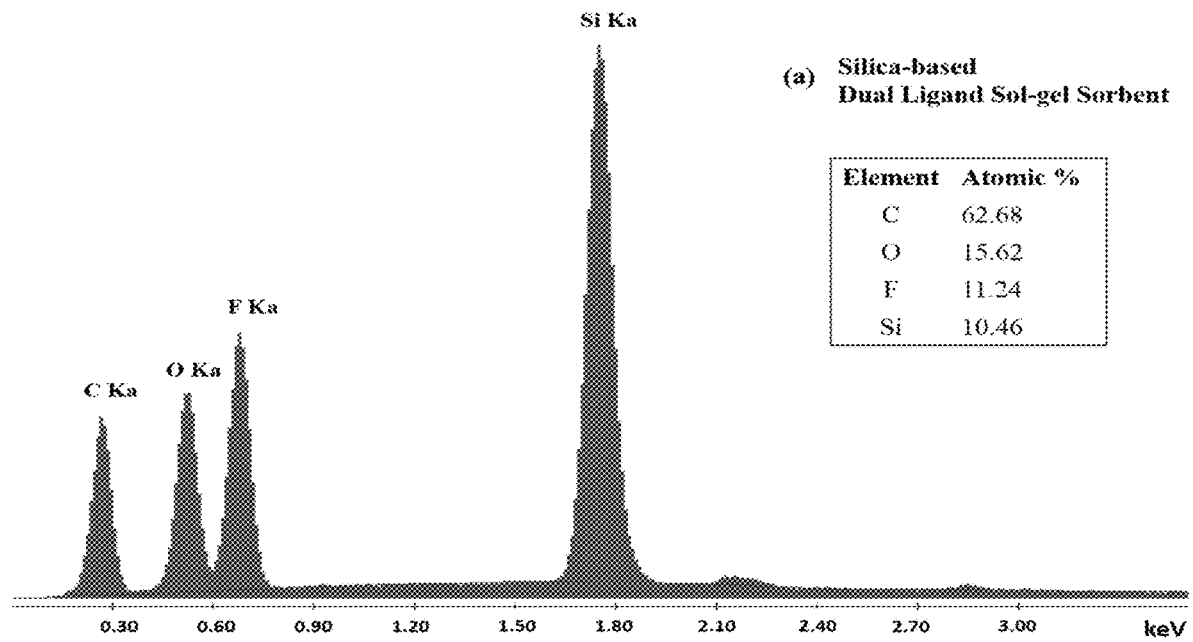
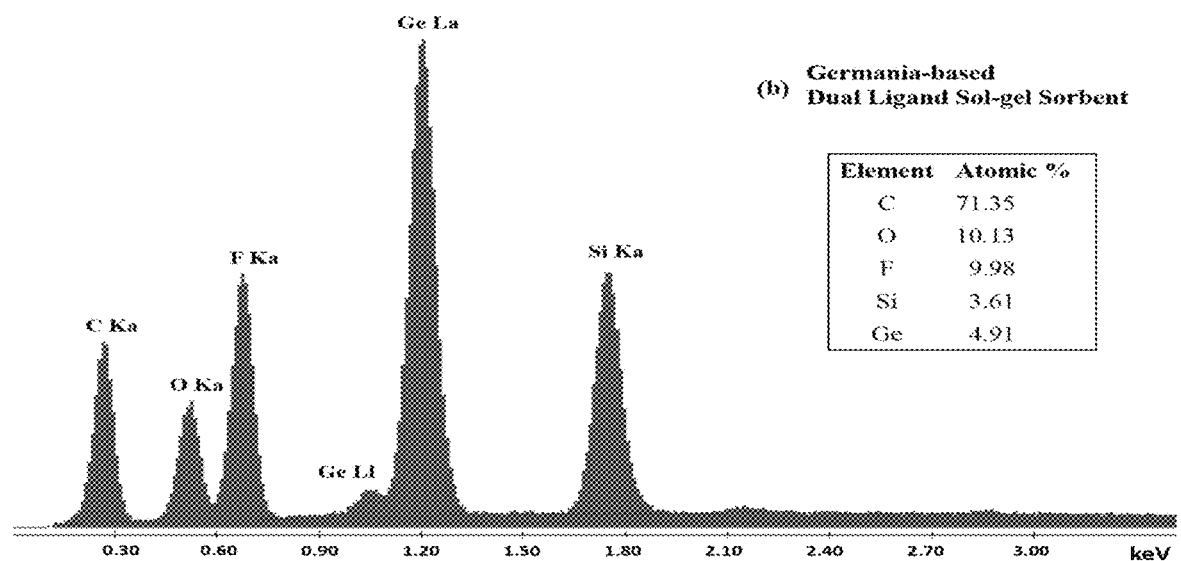
Figure 5A-B

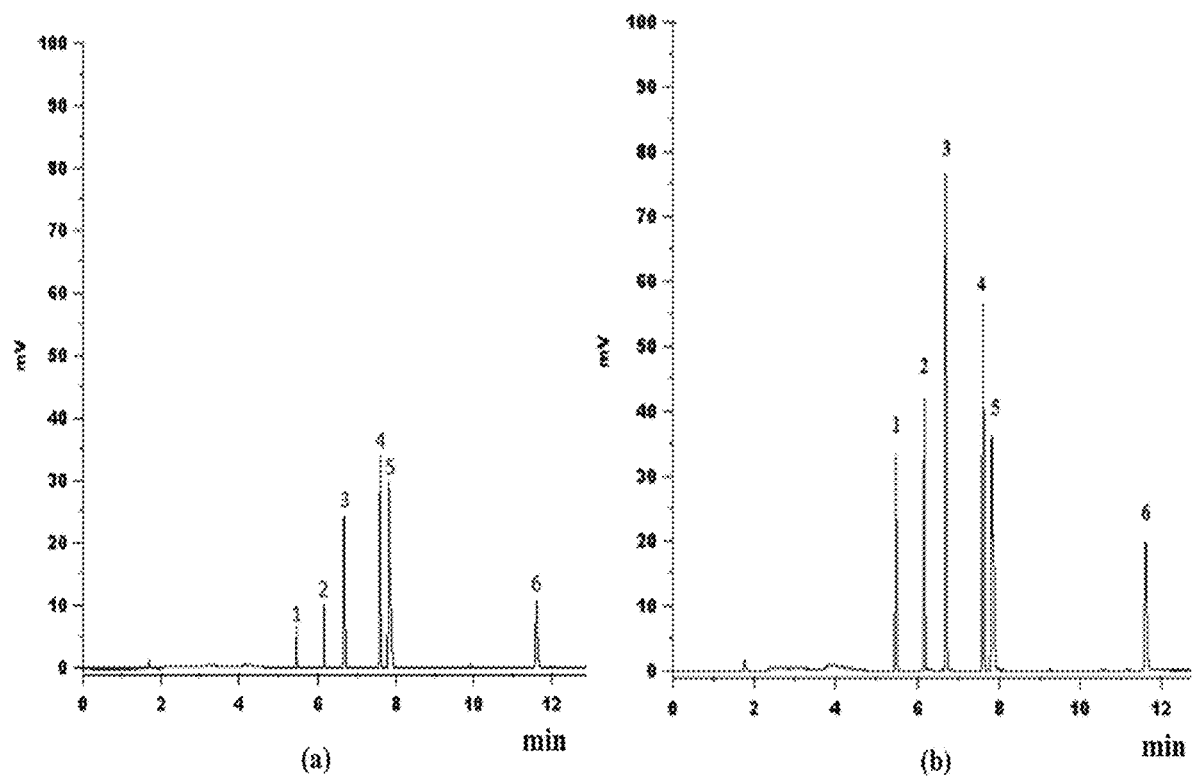
Figure 9A-B

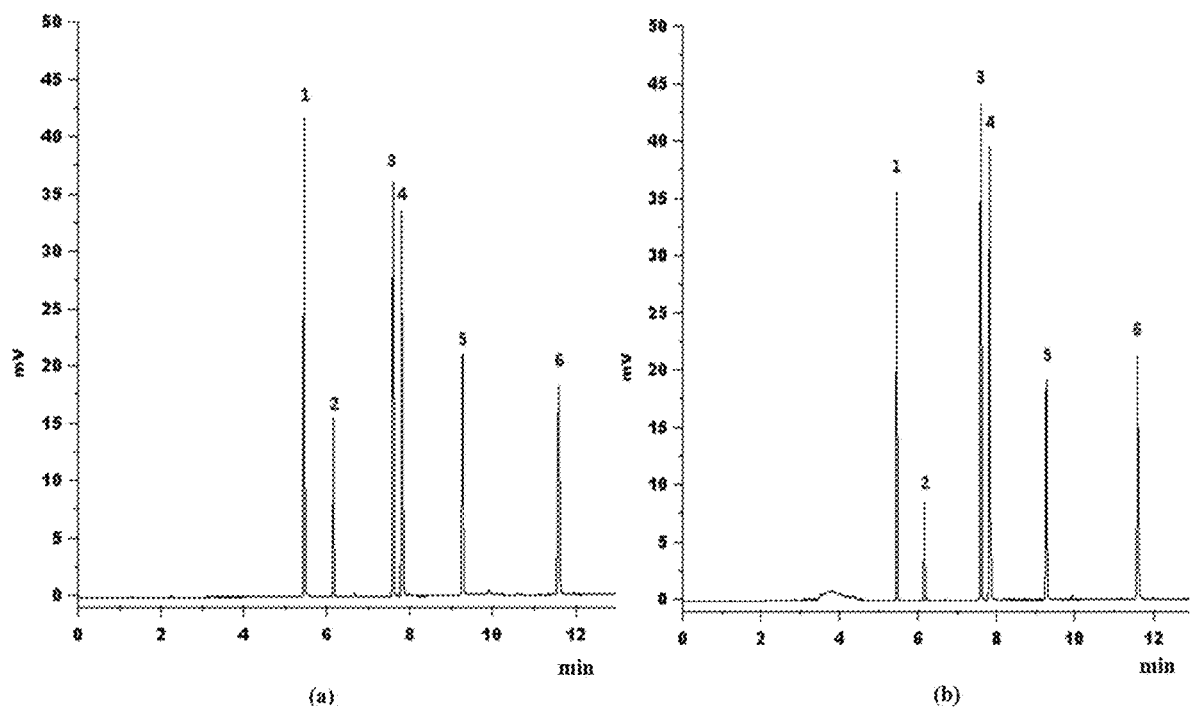
Figure 10A-B

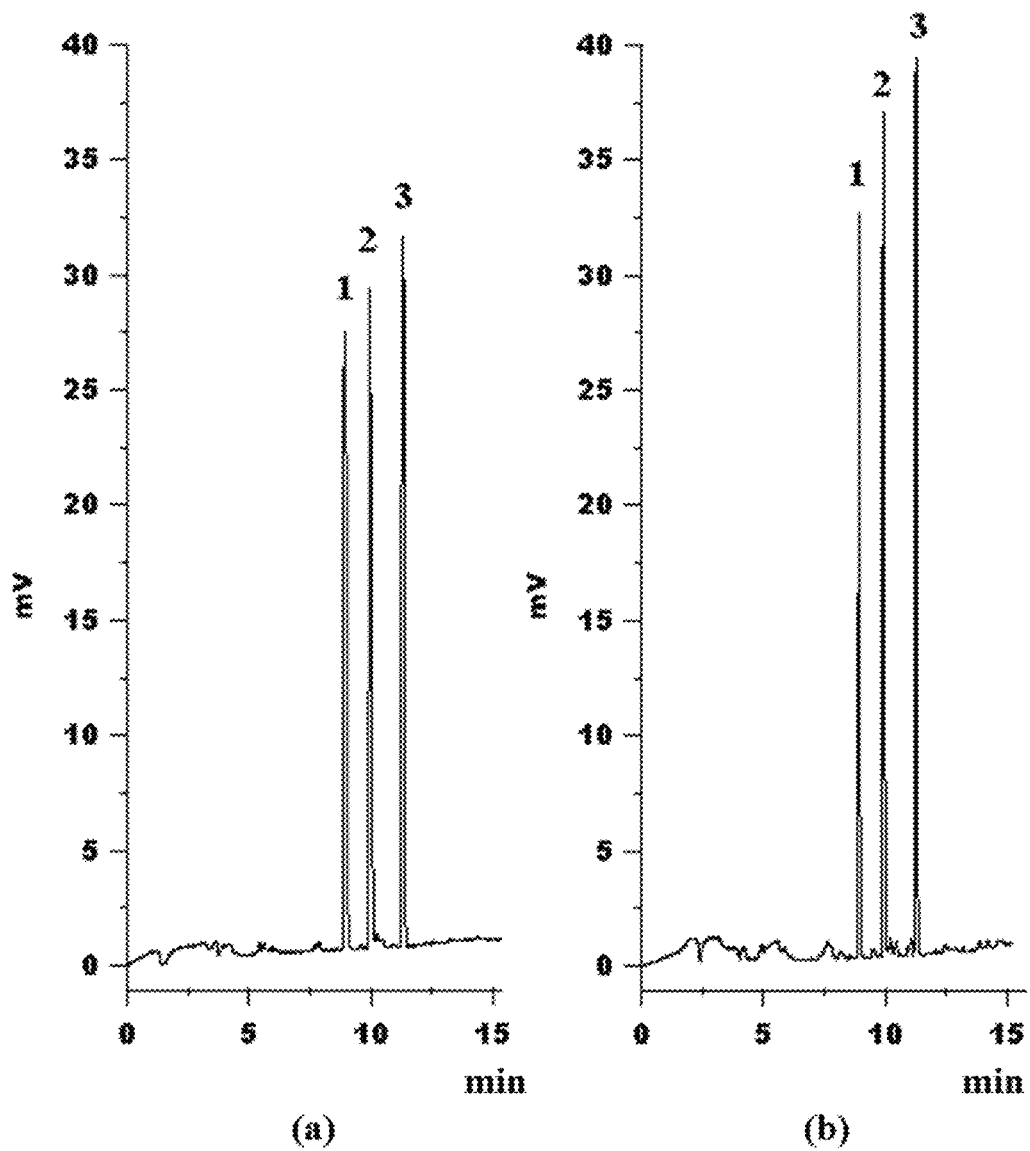
Figure 13A-B

DUAL LIGAND SOL-GEL SORBENT COMBINING SUPERHYDROPHOBICITY AND π-π INTERACTION

CROSS REFERENCE TO RELATED APPLICATIONS

This application is a nonprovisional of and claims priority to U.S. Provisional Patent Application No. 62/422,417, entitled "Dual Ligand Sol-Gel Sorbent Combining Superhydrophobicity and π-π Interaction", filed Nov. 15, 2016, the entire contents of which is herein incorporated into this disclosure.

FIELD OF INVENTION

This invention relates to sorbents. Specifically, the invention relates to dual ligand sol-gel sorbents having enhanced qualities.

BACKGROUND OF THE INVENTION

Solid-phase microextraction (SPME) is a solvent-free, environmentally benign sample preparation technique. (R. P. Belardi, J. B. Pawliszyn, The application of chemically modified fused silica fibers in the extraction of organics from water matrix samples and their rapid transfer to capillary columns, Water Qual. Res. J. Can., 24 (1989) 179-191). Compared with traditional extraction techniques, SPME provides a number of advantages such as complete elimination of organic solvents as extraction media, simplicity in operation, versatility, cost effectiveness, possibility of in vitro as well as in vivo sampling. The ease in coupling of SPME devices to modern analytical techniques such as HPLC, GC, MS, ICP-MS, SFC, CE and CEC have greatly helped SPME in gaining increased popularity. (H. Kataoka, H. L. Lord, J. Pawliszyn, Applications of solid-phase microextraction in food analysis, J. Chromatogr. A, 880 (2000) 35-62; R. Eisert, J. Pawliszyn, Automated in-tube solid-phase microextraction coupled to high-performance liquid chromatography, Anal. Chem., 69 (1997) 3140-3147; Z. Y. Wang, C. H. Xiao, C. Y. Wu, H. M. Han, High-performance polyethylene glycol-coated solid-phase microextraction fibers using sol-gel technology, J. Chromatogr. A, 893 (2000) 157-168; X. G. Yang, T. Peppard, Solid-phase microextraction for flavor analysis, J. Agric. Food Chem., 42 (1994) 1925-1930; W. Hou, Y. Tian, T. Liao, Y. Huang, Z. Tang, Y. Wu, Y. Duan, Development of the mass spectral fingerprint by headspace-solid-phase microextraction-mass spectrometry and chemometric methods for rapid quality control of flavoring essence, Microchem. J., 128 (2016) 75-83; B. Chen, H. Peng, F. Zheng, B. Hu, M. He, W. Zhao, D. Pang, Immunoaffinity monolithic capillary microextraction coupled with ICP-MS for immunoassay with quantum dot labels, J. Anal. At. Spectrom., 25 (2010) 1674-1681; E. Lesellier, Extraction and analysis of polycyclic aromatic hydrocarbons (PAHs) by solid phase micro-extraction/supercritical fluid chromatography (SPME/SFC), Analusis, 27 (1999) 363-368; H. Fang, M. Liu, Z. Zeng, Solid-phase microextraction coupled with capillary electrophoresis to determine ephedrine derivatives in water and urine using a sol-gel derived butyl methacrylate/silicone fiber, Talanta, 68 (2006) 979-986; B. Lin, M.-M. Zheng, S.-C. Ng, Y.-Q. Feng, Development of in-tube solid-phase microextraction coupled to pressure-assisted CEC and its application to the analysis of propranolol enantiomers in human urine, Electrophoresis, 28 (2007) 2771-2780). Development of new sorbent coatings have also significantly contributed to this progress. (M. Saraji, N. Mehrafza, Polysiloxane coated steel fibers for solid-phase microextraction of chlorobenzenes, Microchim. Acta, 182 (2015) 841-848; M. O. Aziz-Zanjani, A. Mehdinia, A review on procedures for the preparation of coatings for solid phase microextraction, Microchim. Acta, 181 (2014) 1169-1190; M. Tian, R. Cheng, J. Ye, X. Liu, Q. Jia, Preparation and evaluation of ionic liquid-calixarene solid-phase microextraction fibres for the determination of triazines in fruit and vegetable samples, Food Chem., 145 (2014) 28-33; J. F. Zhou, C. Ma, S. Zhou, P. L. Ma, F. R. Chen, Y. Qi, H. X. Chen, Preparation, evaluation and application of molecularly imprinted solid-phase microextraction monolith for selective extraction of pirimicarb in tomato and pear, J. Chromatogr. A, 1217 (2010) 7478-7483; Y. L. Hu, Y. Y. Wang, X. G. Chen, Y. F. Hu, G. K. Li, A novel molecularly imprinted solid-phase microextraction fiber coupled with high performance liquid chromatography for analysis of trace estrogens in fishery samples, Talanta, 80 (2010) 2099-2105).

Traditional fiber SPME employs a syringe-like device in which the plunger is connected to a small-diameter fiber with a sorbent coating on its end segment. (Kataoka 2000). In the extraction process, a sorption-desorption equilibrium is established between the sorbent coating on the fiber and the sample matrix. Once this extraction equilibrium has been established, the extracted analytes are transferred to the analytical instrument, typically through desorption (for example, thermal desorption in the injector of a GC system). (S. L. Chong, D. X. Wang, J. D. Hayes, B. W. Wilhite, A. Malik, Sol-gel coating technology for the preparation of solid-phase microextraction fibers of enhanced thermal stability, Anal. Chem., 69 (1997) 3889-3898). However, transferring the extracted analytes to liquid-phase separation systems (e.g., HPLC, CE, etc.) may require complicated sample transfer interfaces. (K. Jinno, M. Taniguchi, M. Hayashida, Solid phase micro extraction coupled with semi-microcolumn high performance liquid chromatography for the analysis of benzodiazepines in human urine, J. Pharm. Biomed. Anal., 17 (1998) 1081-1091).

Even though fiber SPME has gained significant popularity, its operation using conventionally created coatings still faces some inherent disadvantages mainly due to the lack of chemical bonds between the coated extraction medium and the fiber surface. (S. S. Segro, A. Malik, Solvent-resistant sol-gel polydimethyldiphenylsiloxane coating for on-line hyphenation of capillary microextraction with high-performance liquid chromatography, J. Chromatogr. A, 1205 (2008) 26-35; S. S. Segro, A. Malik, Sol-gel methyl coating in capillary microextraction hyphenated on-line with high-performance liquid chromatography—Counterintuitive extraction behavior for polar analytes, J. Chromatogr. A, 1200 (2008) 62-71; S. S. Segro, A. Malik, High-temperature solvent stability of sol-gel germania triblock polymer coatings in capillary microextraction on-line coupled to high-performance liquid chromatography, J. Chromatogr. A, 1217 (2010) 5746-5752; S. S. Segro, M. P. Tran, S. Kesani, A. Alhendal, E. B. Turner, A. Malik, Sol-gel microextraction phases for sample preconcentration in chromatographic analysis, J. Sep. Sci., 33 (2010) 3075-3096; H. Kataoka, Automated sample preparation using in-tube solid-phase microextraction and its application—a review, Anal. Bioanal. Chem., 373 (2002) 31-45). As a result, conventionally prepared SPME coatings are not able to provide exceptional thermal- and solvent stability, and this sometimes puts limitations on their analytical potential when used in hyphenation with GC or HPLC. (Chong 1997; S. S. Segro, J. Triplett, A. Malik, Sol-Gel Germania Triblock Polymer Coatings of Exceptional pH Stability in Capillary Microextraction Online-Coupled to High-Performance Liquid Chromatography, Anal. Chem., 82 (2010) 4107-4113).

In order to overcome the above-mentioned drawbacks of traditional SPME coatings, the inventors developed sol-gel coatings for fiber SPME as well as capillary microextraction (CME) (also known as in-tube SPME). In sol-gel SPME (both in fiber and capillary formats), the surface of the fused silica substrate (fiber or capillary) are coated with sol-gel extraction media. (Chong 1997; S. Bigham, J. Medlar, A. Kabir, C. Shende, A. Alli, A. Malik, Sol-gel capillary microextraction, Anal. Chem., 74 (2002) 752-761). The silanol groups on the fused silica surface get chemically bonded to the sol-gel coating via condensation reaction during evolution of the latter from sol solution. Such chemically anchored sol-gel sorbents are characterized by enhanced thermal stability that opens new possibilities to widen the analytical scope of CME-GC by allowing effective desorption of higher-boiling analytes extracted by the coating. (Eisert 1997; A. Kabir, C. Hamlet, A. Malik, Parts per quadrillion level ultra-trace determination of polar and non-polar compounds via solvent-free capillary microextraction on surface-bonded sol-gel polytetrahydrofuran coating and gas chromatography-flame ionization detection, J. Chromatogr. A, 1047 (2004) 1-13; A. Kabir, C. Hamlet, K. Soo Yoo, G. R. Newkome, A. Malik, Capillary microextraction on sol-gel dendrimer coatings, J. Chromatogr. A, 1034 (2004) 1-11).

Sol-gel prepared SPME fibers with thermal stability up to 400° C. have been reported which indicates that the sol-gel prepared fibers have superior thermal stability over conventionally prepared SPME fibers. (X. Li, Z. Zeng, J. Zhou, High thermal-stable sol-gel-coated calix [4] arene fiber for solid-phase microextraction of chlorophenols, Anal. Chim. Acta, 509 (2004) 27-37). By comparison, conventionally prepared SPME fibers are characterized an upper temperature limit of ≤340° C. Similarly, such chemical anchorage provides the sol-gel coatings with excellent solvent stability in CME-HPLC applications. (S. S. Segro, A. Malik, Solvent-resistant sol-gel polydimethyldiphenylsiloxane coating for on-line hyphenation of capillary microextraction with high-performance liquid chromatography, J. Chromatogr. A, 1205 (2008) 26-35; S. S. Segro, A. Malik, Sol-gel methyl coating in capillary microextraction hyphenated on-line with high-performance liquid chromatography—Counterintuitive extraction behavior for polar analytes, J. Chromatogr. A, 1200 (2008) 62-71; S. S. Segro, A. Malik, High-temperature solvent stability of sol-gel germania triblock polymer coatings in capillary microextraction on-line coupled to high-performance liquid chromatography, J. Chromatogr. A, 1217 (2010) 5746-5752; S. S. Segro, J. Triplett, A. Malik, Sol-Gel Germania Triblock Polymer Coatings of Exceptional pH Stability in Capillary Microextraction Online-Coupled to High-Performance Liquid Chromatography, Anal. Chem., 82 (2010) 4107-4113; S. S. Segro, A. Malik, Sol-gel coatings with covalently attached methyl, octyl, and octadecyl ligands for capillary microextraction. Effects of alkyl chain length and sol-gel precursor concentration on extraction behavior, J. Chromatogr. A, 1216 (2009) 7677-7686).

Exceptional thermal and solvent stabilities offered by sol-gel sorbents led to the development of a compositionally diverse array of sol-gel coatings both for fiber SPME and CME, providing enhanced selectivity and thermal stability in microextraction coupled to GC. These included silica-based microextraction media with organic ligands such as chemically bonded (or intercalated/encapsulated/entrapped) dendrimer, poly(dimethysiloxane) (PDMS), poly(dimethyldiphenylsiloxane) (PDMDPS), cyano-PDMS, ionic liquids, crown ethers, calixarenes, molecularly imprinted polymers (MIP) carbon nanotubes and graphenes. (A. Kabir, C. Hamlet, K. Soo Yoo, G. R. Newkome, A. Malik, Capillary microextraction on sol-gel dendrimer coatings, J. Chromatogr. A, 1034 (2004) 1-11; G. R. Newkome, K. S. Yoo, A. Kabir, A. Malik, Synthesis of benzyl-terminated dendrons for use in high-resolution capillary gas chromatography, Tetrahedron Lett., 42 (2001) 7537-7541; S. Bigham, J. Medlar, A. Kabir, C. Shende, A. Alli, A. Malik, Sol-gel capillary microextraction, Anal. Chem., 74 (2002) 752-761; S. Kulkarni, L. Fang, K. Alhooshani, A. Malik, Sol-gel immobilized cyano-polydimethylsiloxane coating for capillary microextraction of aqueous trace analytes ranging from polycyclic aromatic hydrocarbons to free fatty acids, J. Chromatogr. A, 1124 (2006) 205-216; A. M. Shearrow, S. Bhansali, A. Malik, Ionic liquid-mediated bis[(3-methyldimethoxysilyl)propyl] polypropylene oxide-based polar sol-gel coatings for capillary microextraction, J. Chromatogr. A, 1216 (2009) 6349-6355; A. M. Shearrow, G. A. Harris, L. Fang, P. K. Sekhar, L. T. Nguyen, E. B. Turner, S. Bhansali, A. Malik, Ionic liquid-mediated sol-gel coatings for capillary microextraction, J. Chromatogr. A, 1216 (2009) 5449-5458; X. Zhou, X. Shao, J.-j. Shu, M.-m. Liu, H.-l. Liu, X.-h. Feng, F. Liu, Thermally stable ionic liquid-based sol-gel coating for ultrasonic extraction-solid-phase microextraction-gas chromatography determination of phthalate esters in agricultural plastic films, Talanta, 89 (2012) 129-135; L. Yun, High extraction efficiency solid-phase microextraction fibers coated with open crown ether stationary phase using sol-gel technique, Anal. Chim. Acta, 486 (2003) 63-72; X. Zhou, P.-f. Xie, J. Wang, B.-b. Zhang, M.-m. Liu, H.-l. Liu, X.-h. Feng, Preparation and characterization of novel crown ether functionalized ionic liquid-based solid-phase microextraction coatings by sol-gel technology, J. Chromatogr. A, 1218 (2011) 3571-3580; X. Li, Z. Zeng, S. Gao, H. Li, Preparation and characteristics of sol-gel-coated calix [4] arene fiber for solid-phase microextraction, J. Chromatogr. A, 1023 (2004) 15-25; J.-W. Li, Y.-L. Wang, S. Yan, X.-J. Li, S.-Y. Pan, Molecularly imprinted calixarene fiber for solid-phase microextraction of four organophosphorous pesticides in fruits, Food Chem., 192 (2016) 260-267; M. M. Moein, M. Javanbakht, M. Karimi, B. Akbari-Adergani, M. Abdel-Rehim, Three-phase molecularly imprinted sol-gel based hollow fiber liquid-phase microextraction combined with liquid chromatography-tandem mass spectrometry for enrichment and selective determination of a tentative lung cancer biomarker, J. Chromatogr. B, 995 (2015) 38-45; A. Sarafraz-Yazdi, N. Razavi, Application of molecularly-imprinted polymers in solid-phase microextraction techniques, Trac-Trend Anal. Chem., 73 (2015) 81-90; Y.-L. Wang, Y.-L. Gao, P.-P. Wang, H. Shang, S.-Y. Pan, X.-J. Li, Sol-gel molecularly imprinted polymer for selective solid phase microextraction of organophosphorous pesticides, Talanta, 115 (2013) 920-927; H. Bagheri, Z. Ayazi, A. Aghakhani, A novel needle trap sorbent based on carbon nanotube-sol-gel for microextraction of polycyclic aromatic hydrocarbons from aquatic media, Anal. Chim. Acta, 683 (2011) 212-220; A. Sarafraz-Yazdi, A. Amiri, G. Rounaghi, H. E. Hosseini, A novel solid-phase microextraction using coated fiber based sol-gel technique using poly (ethylene glycol) grafted multi-walled carbon nanotubes for determination of benzene, toluene, ethylbenzene and o-xylene in water samples with gas chromatography-flam ionization detector, J. Chromatogr. A, 1218 (2011) 5757-5764; Z. Tang, Y. Liu, Y. Duan, Development of solid-phase microextraction fibers based on multi-walled carbon nanotubes for pre-concentration and analysis of alkanes in human breath, J. Chromatogr. A, 1425 (2015) 34-41).

Non-silica sol-gel microextraction sorbents in the form of titania-, zirconia-, and germania-based coatings were also developed for use in conjunction with GC. Additionally, non-silica based sol-gel systems (e.g., titania-, zirconia-, and germania-based sol-gel coatings) were developed to provide sorbents with exceptional pH stability. (S. S. Segro, A. Malik, High-temperature solvent stability of sol-gel germania triblock polymer coatings in capillary microextraction on-line coupled to high-performance liquid chromatography, J. Chromatogr. A, 1217 (2010) 5746-5752; S. S. Segro, J. Triplett, A. Malik, Sol-Gel Germania Triblock Polymer Coatings of Exceptional pH Stability in Capillary Microextraction Online-Coupled to High-Performance Liquid Chromatography, Anal. Chem., 82 (2010) 4107-4113; T.-Y. Kim, K. Alhooshani, A. Kabir, D. P. Fries, A. Malik, High pH-resistant, surface-bonded sol-gel titania hybrid organic-inorganic coating for effective on-line hyphenation of capillary microextraction (in-tube solid-phase microextraction) with high-performance liquid chromatography, J. Chromatogr. A, 1047 (2004) 165-174; K. Alhooshani, T.-Y. Kim, A. Kabir, A. Malik, Sol-gel approach to in situ creation of high pH-resistant surface-bonded organic-inorganic hybrid zirconia coating for capillary microextraction (in-tube SPME), J. Chromatogr. A, 1062 (2005) 1-14; L. Fang, S. Kulkarni, K. Alhooshani, A. Malik, Germania-based, sol-gel hybrid organic-inorganic coatings for capillary microextraction and gas chromatography, Anal. Chem., 79 (2007) 9441-9451).

The composition and structure of the organic ligand play important roles in the microextraction process since microextraction is based on molecular level analyte-sorbent interactions that are dependent on structural and compositional aspects of these interacting partners. Thus, nonpolar hydrophobic analytes can be effectively extracted via hydrophobic interaction with a nonpolar ligand on the sorbent. Similarly, enhanced extraction selectivity toward aromatic analytes can be achieved through π-π interaction with aromatic group-containing ligands on microextraction sorbents. (H. Kataoka, Automated sample preparation using in-tube solid-phase microextraction and its application—a review, Anal. Bioanal. Chem., 373 (2002) 31-45; A. Kabir, K. G. Furton, A. Malik, Innovations in sol-gel microextraction phases for solvent-free sample preparation in analytical chemistry, Trac-Trend Anal. Chem., 45 (2013) 197-218; D. Marchand, K. Croes, J. Dolan, L. Snyder, R. Henry, K. Kallury, S. Waite, P. Carr, Column selectivity in reversed-phase liquid chromatography: VIII. Phenylalkyl and fluoro-substituted columns, J. Chromatogr. A, 1062 (2005) 65-78).

Perfluorinated aliphatic chains possess exceptionally high hydrophobicity (superhydrophobicity) compared with their non-fluorinated counterparts ($CF_2$- to $CH_2$-hydrophobicity ratio is 1.7). (E. Blanco, A. Gonzalez-Perez, J. M. Ruso, R. Pedrido, G. Prieto, F. Sarmiento, A comparative study of the physicochemical properties of perfluorinated and hydrogenated amphiphiles, J. Colloid Interface Sci., 288 (2005) 247-260; F. Petit, I. Lliopoulos, R. Audebert, Hydrophobically modified polyelectrolytes with perfluorinated or hydrogenated side alkyl chains. Comparison of the associating behavior, J. Chim. Phys. PCB, 93 (1996) 887-898). Apart from microextraction, the ultrahigh hydrophobicity inherent in perfluoroalkyl groups has been advantageously used to create superhydrophobic materials. (Y. Gao, Y. Huang, S. Feng, G. Gu, F.-L. Qing, Novel superhydrophobic and highly oleophobic PFPE-modified silica nanocomposite, J. Mater. Sci., 45 (2010) 460-466). Sol-gel sorbents that simultaneously contain two ligands—one representing a highly hydrophobic perfluorinated aliphatic chain and the other containing a phenyl group (with the ability to provide π-π interaction) can be expected to provide enhanced extraction capability for both aliphatic and aromatic hydrocarbons as their nonpolar derivatives.

The inventors report the synthesis of sol-gel coatings designed to provide a combination of enhanced hydrophobic- and π-π interactions, and present a systematic evaluation of their analytical performances in CME. The inventors are the first to use dual-ligand containing silica- and germania-based sol-gel sorbents in CME-GC. Microextraction performances of the sol-gel sorbents with varying ligand concentration were investigated using aliphatic hydrocarbons, aromatic hydrocarbons and alkylbenzenes (containing both aliphatic and aromatic parts in their molecules) as test probes. Additionally, the inventors explored the effects of the inorganic component of these sorbents (silica and germania) on microextraction behavior.

SUMMARY OF INVENTION

Nonpolar/hydrophobic molecules represent important environmental pollutants (e.g., oil spill pollution of the marine environment), carcinogenic or mutagenic health hazards (e.g., polycyclic aromatic hydrocarbons), biomarkers for various diseases (e.g., cancer, oxidative stress, etc.), small molecule drugs, evolutionary biomarkers (e.g., hopanoids), etc. Therefore, analytical capability to enrich trace- and ultra-trace concentrations of nonpolar/hydrophobic compounds is important from a biomedical, environmental, ecological, pharmaceutical, and marine biology points of view. In many cases, isolation and preconcentration/enrichment of these analytes become critically important, especially when they exist in trace-/ultra-trace concentrations. Traditionally, enrichment of nonpolar/hydrophobic compounds is achieved by using silica-based sorbents with bonded nonpolar organic ligand(s) (e.g., octadecyl-bonded silica).

In the present invention, enhanced extraction and preconcentration of nonpolar/hydrophobic analytes are achieved on the proposed sol-gel sorbent designed to simultaneously possess two surface-bonded organic ligands that provide superior enrichment of nonpolar analytes by cooperatively exploiting superhydrophobicity of one ligand (e.g., perfluorocarbon ligand) and π-π interaction ability of the other (e.g., aryl group). Further enhancement in the enrichment of nonpolar/hydrophobic analytes is achieved by substituting the silica substrate of the sorbent with germania, thereby also providing enhanced solvent- and pH stabilities.

Principles of sol-gel chemistry were utilized to create silica- and germania-based sol-gel surface-bonded dual-ligand coatings to achieve enhanced performance in capillary microextraction (CME) through a combination of fluorocarbon superhydrophobicity and π-π interaction capability of an aromatic ring. These organic-inorganic hybrid coatings were prepared using sol-gel precursors with bonded perfluorododecyl (PF-$C_{12}$) and phenethyl (PhE) ligands. The ability of the PF-$C_{12}$ ligand to provide enhanced hydrophobic interaction was advantageously combined with π-π interaction ability of the PhE moiety to attain the desired sorbent performance in CME. The effect of the inorganic component to the microextraction performance of sol-gel sorbents were also monitored by comparing silica-vs-germania-based materials. The germania-based dual-ligand sol-gel sorbent demonstrated superior CME performance compared to its silica-based counterpart. Thermogravimetric analysis (TGA) of the created silica- and germania-based dual-ligand sol-gel sorbents suggested higher carbon loading on the germania-based sorbent. This might be indicative of more effective condensation of the organic ligand-bearing sol-gel-active chemical species to the germania-based sol-gel network (than to its silica-based counterpart) evolving in the sol solution. The type and concentration of the organic ligands were varied in the sol-gel sorbents to fine-tune extraction selectivity toward different classes of analytes. Specific extraction (SE) values were used for an objective comparison of the prepared sol-gel CME sorbents. The sorbents with higher content of PF-$C_{12}$ showed remarkably high affinity for aliphatic hydrocarbons. Compared to their single-ligand sol-gel counterparts, the dual-ligand sol-gel coatings demonstrated significantly superior CME performance in the extraction of alkylbenzenes, providing up to ~65.0% higher SE values. The prepared sol-gel CME coatings provided low ng $L^{-1}$ limit of detection (LOD) values (4.2-26.3 ng $L^{-1}$) for environmentally important analytes including polycyclic aromatic hydrocarbons, ketones and aliphatic hydrocarbons. In CME-GC experiments (n=5), the capillary-to-capillary RSD value was ~2.1%; such a low RSD value is indicative of excellent reproducibility of the sol-gel method used for the preparation of these CME coatings. The dual-ligand sol-gel coating provided stable performance in capillary microextraction of analytes from saline samples, providing inherently low RSD values comparable to, or smaller than, the RSD values obtained on the same coating but using samples with non-saline matrices.

A dual ligand sol-gel sorbent is presented comprising: at least two sol-gel precursors wherein the sol-gel precursors are organic ligands; an inorganic co-precursor; and a catalyst wherein the catalyst is trifluoroacetic acid (TFA). In an embodiment, there are two sol-gel precursors such as a perfluoroalkyl ligand and a phenethyl ligand. The perfluoroalkyl can be perfluorododecyl (PF-$C_{12}$). The inorganic co-precursor can be a germania co-precursor such as TEOG or a silica co-precursor such as TMOS. The organic ligands may be in equimolar concentration.

In an embodiment, a method of manufacturing a dual-ligand sol-gel sorbent for use in solid phase microextraction (SPME) is presented comprising: adding at least two sol-gel precursors to a vial wherein the at least two sol-gel precursors are organic ligands; adding an inorganic co-precursor to the vial; and adding a catalyst to the vial to form a solution wherein the catalyst is trifluoroacetic acid (TFA). Selectivity for an analyte in SPME can be controlled by adjusting a ratio of the at least two sol-gel precursors. A mixing step can be done after the addition of each compound. In an embodiment, there are two sol-gel precursors such as a perfluoroalkyl ligand and a phenethyl ligand. The perfluoroalkyl can be perfluorododecyl (PF-$C_{12}$). The inorganic co-precursor can be a germania co-precursor such as TEOG or a silica co-precursor such as TMOS. The organic ligands may be in equimolar concentration.

In an embodiment, a method of coating an interior of at least one silica capillary for use in solid phase microextraction (SPME) with a dual-ligand sol-gel sorbent is presented comprising: performing hydrothermal pretreatment on the at least one silica capillary; filling the at least one silica capillary with a sol solution of dual-ligand sol-gel sorbent comprising: at least two sol-gel precursors such as a perfluoroalkyl ligand like perfluorododecyl (PF-$C_{12}$) and a phenethyl ligand; an inorganic co-precursor such as TEOG or TMOS; and a catalyst such as trifluoroacetic acid (TFA); subjecting the at least one silica capillary to nitrogen pressure; and conditioning the at least one silica capillary in an oven. Selectivity for an analyte in SPME can be controlled by adjusting a ratio of the at least two sol-gel precursors.

BRIEF DESCRIPTION OF THE DRAWINGS

For a fuller understanding of the invention, reference should be made to the following detailed description, taken in connection with the accompanying drawings, in which:

FIG. 1B is an image depicting the chemical reactions involved in the formation of sol-gel coatings showing formation of a surface-bonded sol-gel coating within the fused silica capillary evolution of a sol-gel network in the sol solution within the capillary.

FIG. 3A-B are images depicting FTIR spectra for (a) Sol-gel silica-based equimolar dual ligand sorbent (b) Sol-gel germania-based equimolar dual-ligand sorbent used in CME.

FIG. 4A-B are SEM images of the dual-ligand containing germania-based sol-gel sorbent coating. (A) cross-sectional view of a fused silica capillary containing sol-gel sorbent coated on the inner surface; (B) thickness of the sol-gel coating to be approximately 2.2 µm.

FIG. 5A-B are a series of images depicting the energy dispersive x-ray spectroscopy (EDS) spectra of the silica-based (A) and germania-based (B) dual-ligand containing sol-gel sorbents.

FIG. 9A-B are a series of chromatograms belonging to sol-gel PF-$C_{12}$/PhE=1:1 coatings with (a) $SiO_2$ and (b) $GeO_2$ co-precursors and identical molar concentration of organic ligands. The analytes were 1=Octane (30 µg $L^{-1}$), 2=Nonane (30 µg $L^{-1}$), 3=Propylbenzene (25 µg $L^{-1}$), 4=Butylcyclohexane (25 µg $L^{-1}$), 5=Butylbenzene (20 µg $L^{-1}$) 6=Naphthalene (15 µg $L^{-1}$). CME-GC Conditions: 10 cm×0.25 mm I.D. sol-gel PF-$C_{12}$/PhE=1:1 $SiO_2$ and $GeO_2$ based coated capillaries with extraction time 60 min. GC column: 30 m×0.25 mm I.D. Restek Rtx-35 MS Crossbond 35% diphenyl/65% dimethylpolysiloxane. GC run 25° C.-90° C. (rate:

25° C. min$^{-1}$) 90-300° C. (rate: 7° C. min$^{-1}$), nitrogen carrier gas, injector 300° C., FID 350° C., splitless desorption.

FIG. 10A-B are a series of chromatograms belonging to sol-gel coatings with (a) PF-C$_{12}$/PhE=2:1 (SiO$_2$) and (b) PF-C$_{12}$/PhE=1:2 (SiO$_2$). The analytes were 1=Octane (100 μg L$^{-1}$), 2=Nonane (30 μg L$^{-1}$), 3=Butylcyclohexane (20 μg L$^{-1}$), 4=Butylbenzene (10 μg L$^{-1}$), 5=Undecane (20 μg L$^{-1}$) 6=Naphthalene (15 μg L$^{-1}$). CME-GC system conditions were identical as in FIG. 9.

Figure 11A:
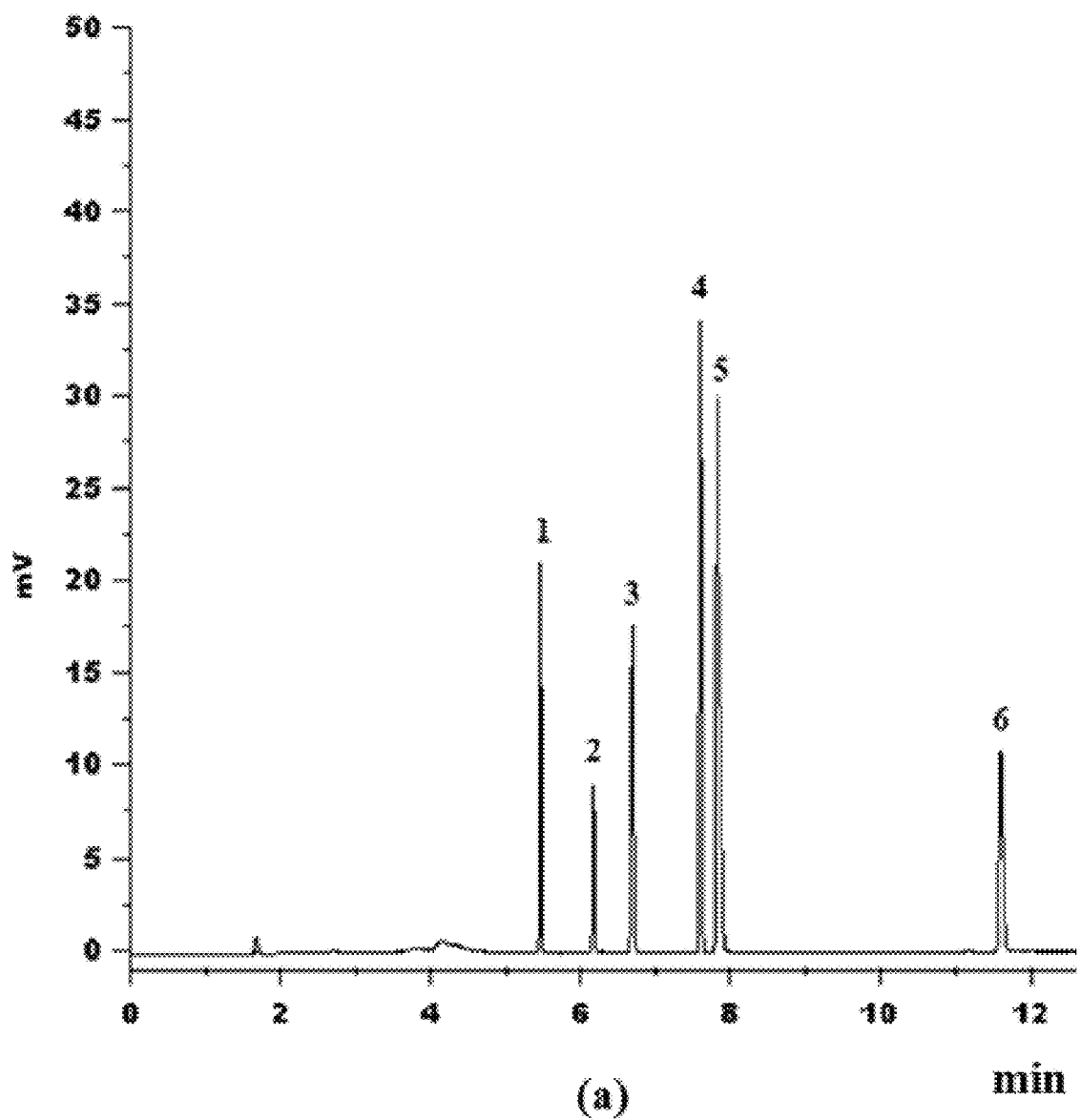

FIG. 11A is a chromatogram belonging to sol-gel coating with (a) PF-C$_{12}$/PhE=1:1. The analytes were 1=Octane (75 μg L$^{-1}$), 2=Nonane (25 μg L$^{-1}$), 3=Propylbenzene (10 μg L$^{-1}$), 4=Butylcyclohexane (25 μg L$^{-1}$), 5=Butylbenzene (20 μg L$^{-1}$) 6=Naphthalene (10 μg L$^{-1}$). CME-GC system conditions were identical as in FIG. 9.

Figure 11B:
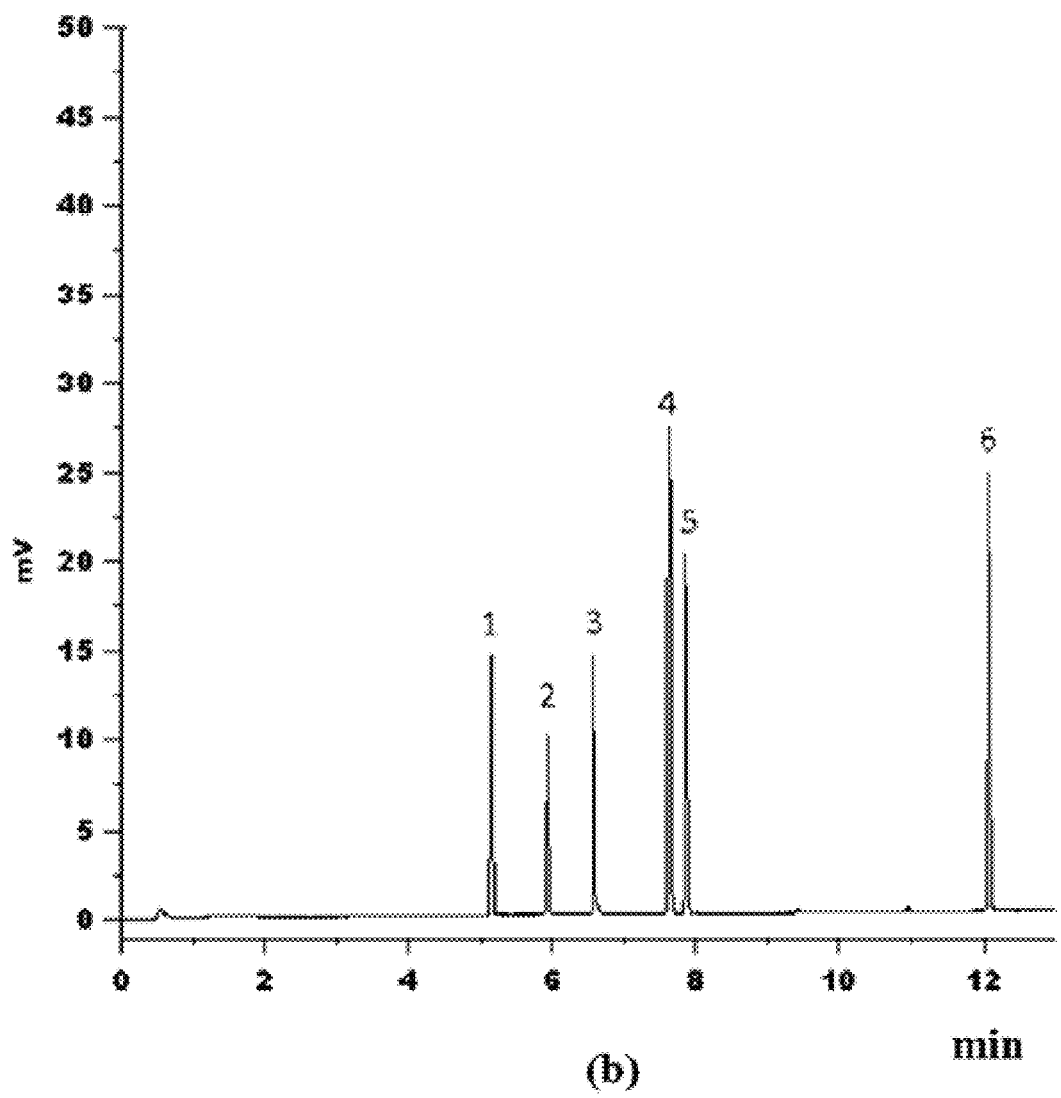

FIG. 11B is a chromatogram belonging to sol-gel coating with (b) PhE (SiO$_2$). The analytes were 1=Octane (75 μg L$^{-1}$), 2=Nonane (25 μg L$^{-1}$), 3=Propylbenzene (10 μg L$^{-1}$), 4=Butylcyclohexane (25 μg L$^{-1}$), 5=Butylbenzene (20 μg L$^{-1}$) 6=Naphthalene (10 μg L$^{-1}$). CME-GC system conditions were identical as in FIG. 9.

Figure 11C:
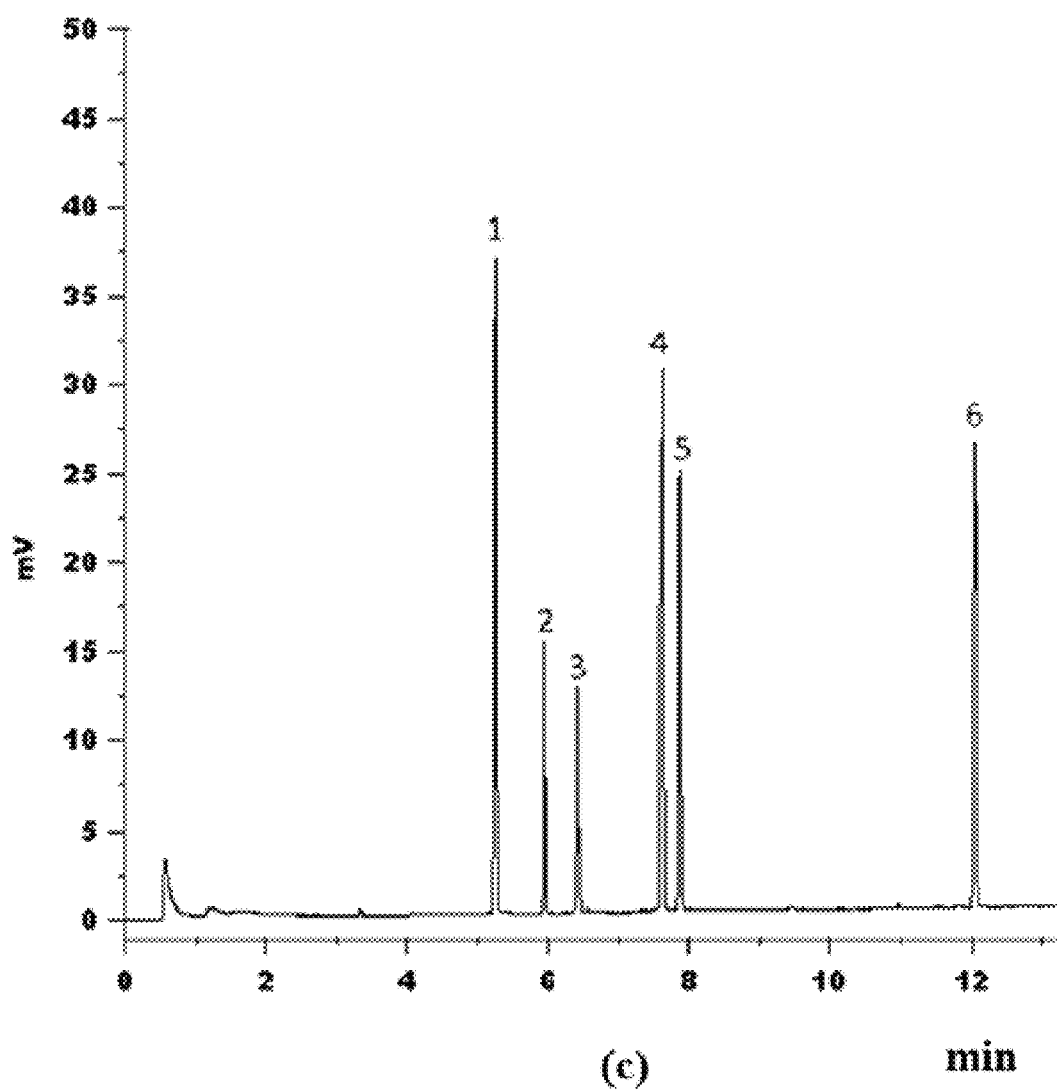

FIG. 11C is a chromatogram belonging to sol-gel coating with (c) PF-C$_{12}$ with (SiO$_2$). The analytes were 1=Octane (75 μg L$^{-1}$), 2=Nonane (25 μg L$^{-1}$), 3=Propylbenzene (10 μg L$^{-1}$), 4=Butylcyclohexane (25 μg L$^{-1}$), 5=Butylbenzene (20 μg L$^{-1}$) 6=Naphthalene (10 μg L$^{-1}$). CME-GC system conditions were identical as in FIG. 9.

Figure 12A:
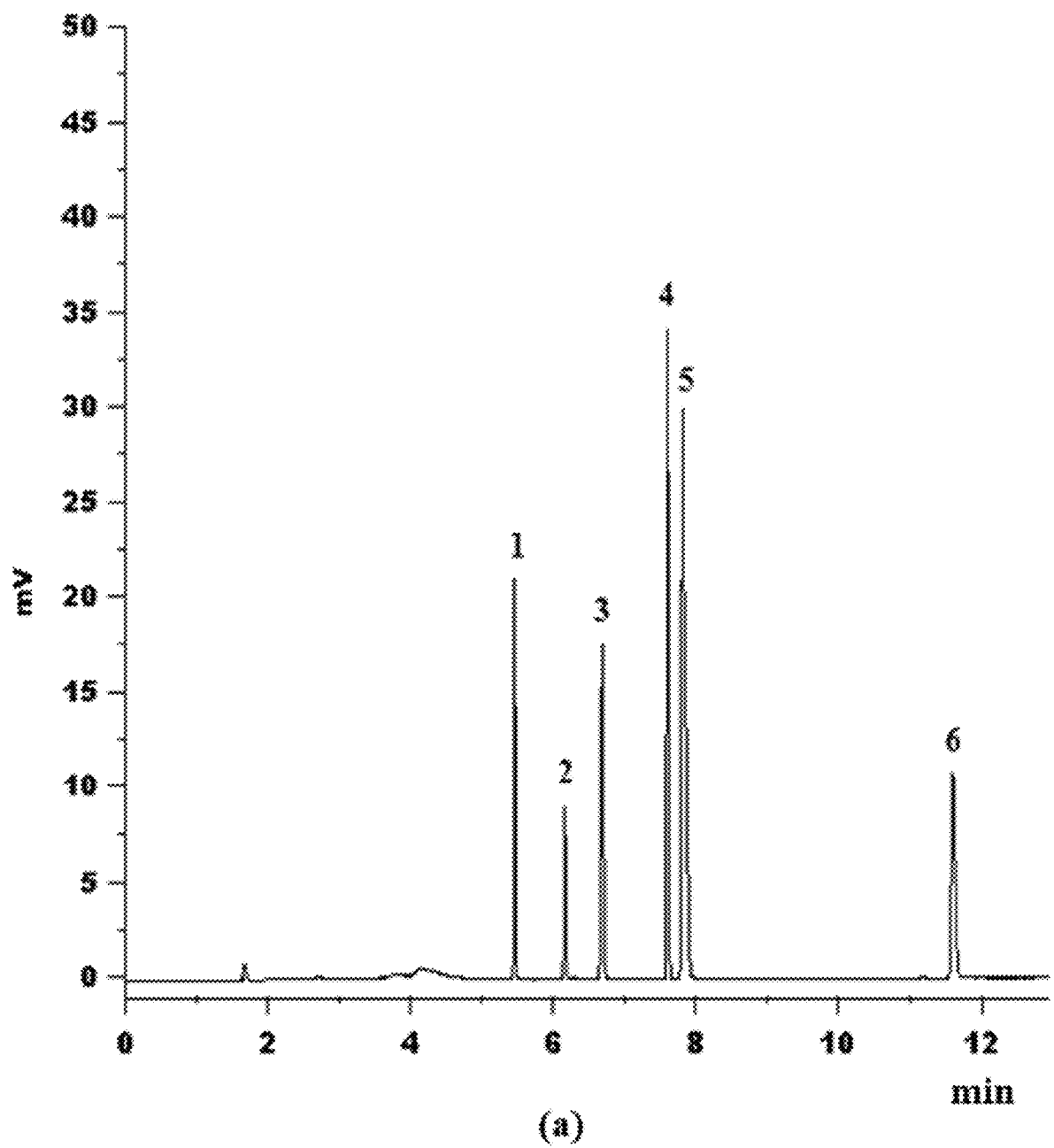

FIG. 12A is a chromatogram belonging to sol-gel coating with PF-C$_{12}$/PhE=1:1 SiO$_2$. The analytes were 1=Octane (75 μg L$^{-1}$), 2=Nonane (25 μg L$^{-1}$), 3=Propylbenzene (10 μg L$^{-1}$), 4=Butylcyclohexane (25 μg L$^{-1}$), 5=Butylbenzene (20 μg L$^{-1}$) 6=Naphthalene (10 μg L$^{-1}$). CME-GC conditions were identical as in FIG. 9.

Figure 12B:
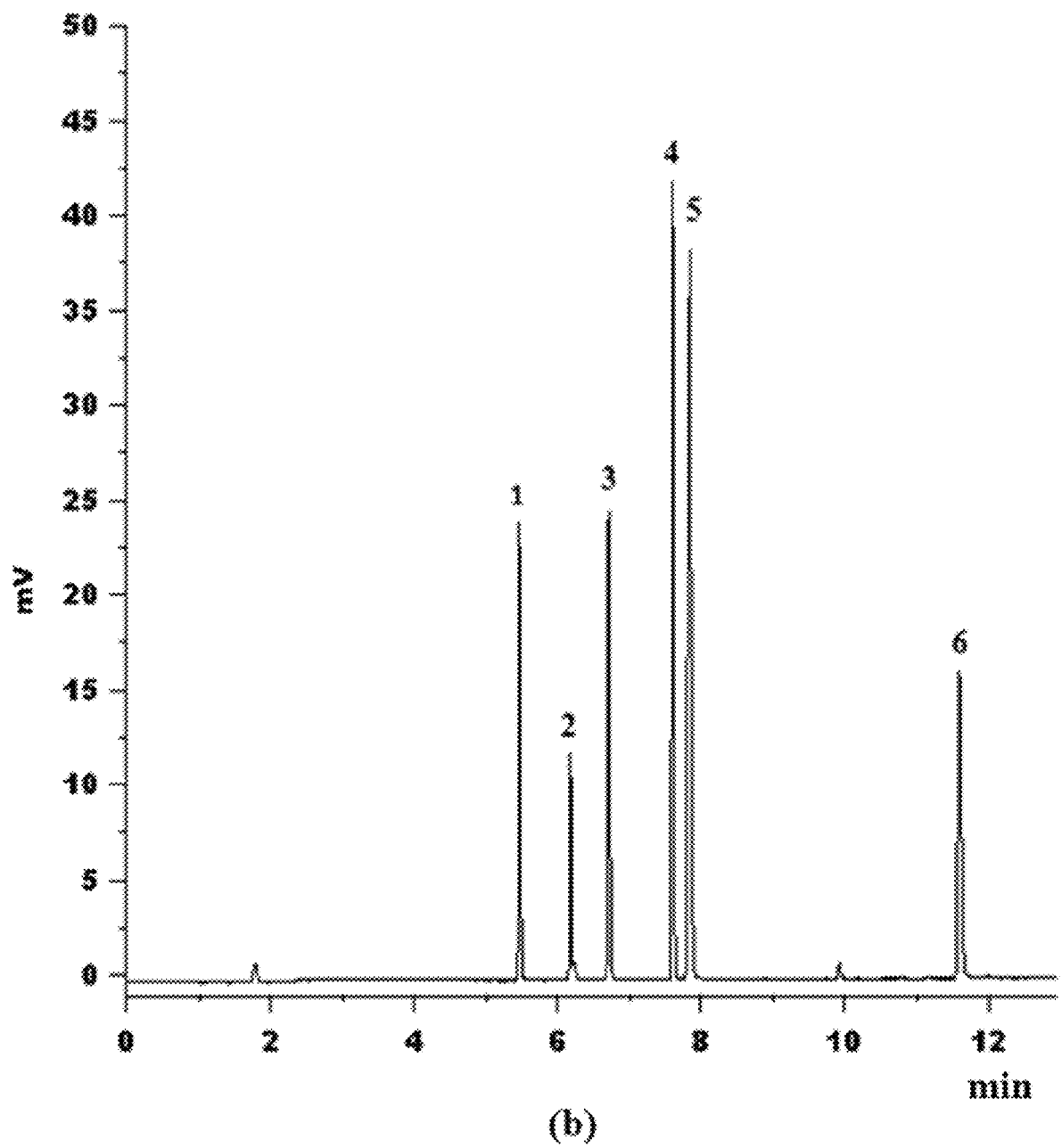

FIG. 12B is a chromatogram belonging to sol-gel coating with PF-C$_{12}$/PhE=1:1 SiO$_2$. 599 mM NaCl concentration was kept in the solution used to get the second chromatogram (b). The analytes were 1=Octane (75 μg L$^{-1}$), 2=Nonane (25 μg L$^{-1}$), 3=Propylbenzene (10 μg L$^{-1}$), 4=Butylcyclohexane (25 μg L$^{-1}$), 5=Butylbenzene (20 μg L$^{-1}$) 6=Naphthalene (10 μg L$^{-1}$). CME-GC conditions were identical as in FIG. 9.

FIG. 13A-B are a series of chromatograms belonging to (a) silica-based sol-gel coating and (b) germania-based sol-gel coating (PF-C$_{12}$/PhE=1:1). The analytes were 1=Decanal, 2=Decanol and 3=Butyrophenone, with identical concentration of 150 μg L$^{-1}$. GC run 45° C.-120° C. (rate 30° C. min$^{-1}$), 120° C.-280° C. (rate=6° C. min$^{-1}$), other system conditions were identical as in FIG. 9.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments by which the invention may be practiced. It is to be understood that other embodiments may be utilized and structural changes may be made without departing from the scope of the invention.

Definitions

Unless otherwise defined, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are described herein. All publications mentioned herein are incorporated herein by reference in their entirety to disclose and describe the methods and/or materials in connection with which the publications are cited. It is understood that the present disclosure supercedes any disclosure of an incorporated publication to the extent there is a contradiction.

All numerical designations, such as pH, temperature, time, concentration, and molecular weight, including ranges, are approximations which are varied up or down by increments of 1.0 or 0.1, as appropriate. It is to be understood, even if it is not always explicitly stated that all numerical designations are preceded by the term "about". It is also to be understood, even if it is not always explicitly stated, that the reagents described herein are merely exemplary and that equivalents of such are known in the art and can be substituted for the reagents explicitly stated herein.

Concentrations, amounts, solubilities, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include the individual values and sub-ranges within the indicated range. Thus, included in this numerical range are individual values such as 2, 3, and 4 and sub-ranges such as from 1-3, from 2-4 and from 3-5, etc. This same principle applies to ranges reciting only one numerical value. Furthermore, such an interpretation should apply regardless of the range or the characteristics being described.

The term "about" or "approximately" as used herein refers to being within an acceptable error range for the particular value as determined by one of ordinary skill in the art, which will depend in part on how the value is measured or determined, i.e. the limitations of the measurement system, i.e. the degree of precision required for a particular purpose, such as a pharmaceutical formulation. Where particular values are described in the application and claims, unless otherwise stated, the term "about" meaning within an acceptable error range for the particular value should be assumed. As used herein, "about" refers to +15%.

As used in the specification and claims, the singular form "a", "an" and "the" include plural references unless the context clearly dictates otherwise.

"Sol-gel sorbent" as used herein is defined as a sorbent produced through a sol-gel process in which at least two sol-gel precursors are mixed with an inorganic co-precursor and a catalyst such as trifluoroacetic acid (TFA). The sol-gel sorbent is chemically bound to the inner walls of a fused silica capillary surface through a condensation reaction with the silanol groups on the inner surface of the capillary. The sol-gel sorbent is capable of allowing effective desorption of higher-boiling analytes extracted by the sorbent.

"Sol-gel precursor" as used herein is defined as an organic ligand that exhibits superhydrophobicity and/or the ability to provide π-π interaction and is capable of being used in the sol-gel reactions described herein. The sol-gel precursors can be at least two organic ligands, the first of which exhibits superhydrophobicity and the second of which provides the π-π interaction. An example of an organic ligand providing superhydrophobicity includes perfluorinated aliphatic chains. An organic ligand containing a phenyl group is able to provide a π-π interaction. The combination of two organic ligands provides enhanced extraction capability for both aliphatic and aromatic hydrocarbons as their nonpolar derivatives.

"Organic ligand" as used herein is defined as a molecule that can bind to and form a stable complex with trace metals in the aquatic dissolved phase. Ligand nonpolar hydrophobic analytes can be effectively extracted via hydrophobic interaction with a nonpolar ligand on the sorbent. Similarly, enhanced extraction selectivity toward aromatic analytes can be achieved through π-π interaction with aromatic group-containing ligands on microextraction sorbents. Examples of organic ligands exhibiting superhydrophobicity that can be used in the instant invention include, but are not limited to, perfluorocarbons Examples of organic ligands which provide π-π interaction include, but are not limited to, aryl groups. In some embodiments, the sol-gel solvent uses a perfluoroalkyl and a phenyl. In some embodiments, the perfluoroalkyl is a perfluorododecyl (PF-$C_{12}$) and the phenyl is a phenethyl (PhE).

"Co-precursor" as used herein is defined as a chemical that is transformed into another compound, specifically an inorganic compound including, but not limited to, silica, titania, zirconia and germania. Examples of co-precursors used herein include, but are not limited to, TEOG (a sol-gel co-precursor for $GeO_2$) and TMOS (a sol-gel co-precursor for $SiO_2$).

"Catalyst" as used herein refers to a chemical or compound which can be used to allow the chemical reaction of producing the dual-ligand sol-gel sorbent to proceed. In an embodiment, the catalyst may be trifluoroacetic acid (TFA).

Sol-gel chemistry provides an effective pathway to chemically bind an evolving sol-gel network to the inner walls of a fused silica capillary through a condensation reaction with the silanol groups residing on the capillary inner surface. However, the silanol group concentration on fused silica capillary surface is typically low due to high temperatures (~2000° C.) used in the capillary drawing process. For effective chemical anchorage of the sol-gel coating to the capillary surface, it is important to ensure enhanced silanol concentration as well as uniformity of their distribution on the capillary inner surface. This is accomplished by hydrothermal pretreatment of the capillary. (J. D. Hayes, A. Malik, Sol-gel open tubular ODS columns with reversed electroosmotic flow for capillary electrochromatography, Anal. Chem., 73 (2001) 987-996).

In the capillary surface pretreatment procedure, first the capillary surface was cleaned by rinsing with a series of solvents; water being the last solvent to rinse the capillary. As a result, at the end of the rinsing procedure, a thin layer of water was left on the capillary inner surface. When such a capillary was heated to 350° C. with both ends sealed, the siloxane bridges on fused silica surface had favorable conditions to undergo hydrolysis to generate silanol groups. (C. Brinker, R. Kirkpatrick, D. Tallant, B. Bunker, B. Montez, NMR confirmation of strained "defects" in amorphous silica, J Non-Cryst. Solids, 99 (1988) 418-428). The subsequent operation involving simultaneous heating and purging of the capillary provided favorable conditions for the reverse reaction and resulted in the moderation of silanol surface concentration at the desired level.

Figure 1A:
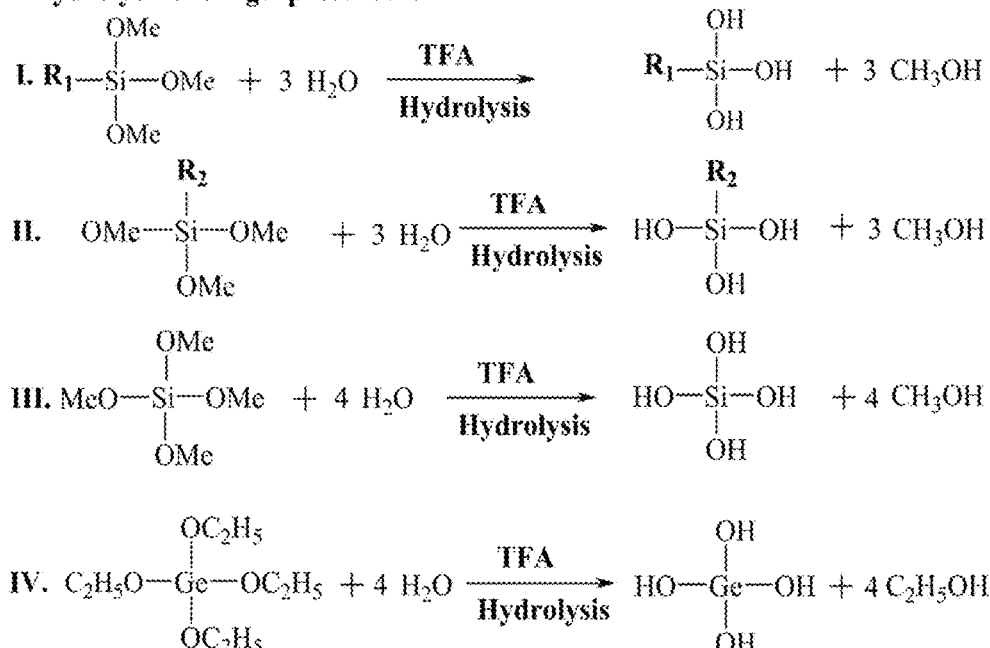
FIG. 1A is an image depicting the chemical reactions involved in the formation of sol-gel coatings showing hydrolysis of sol-gel precursors.
Figure 2:
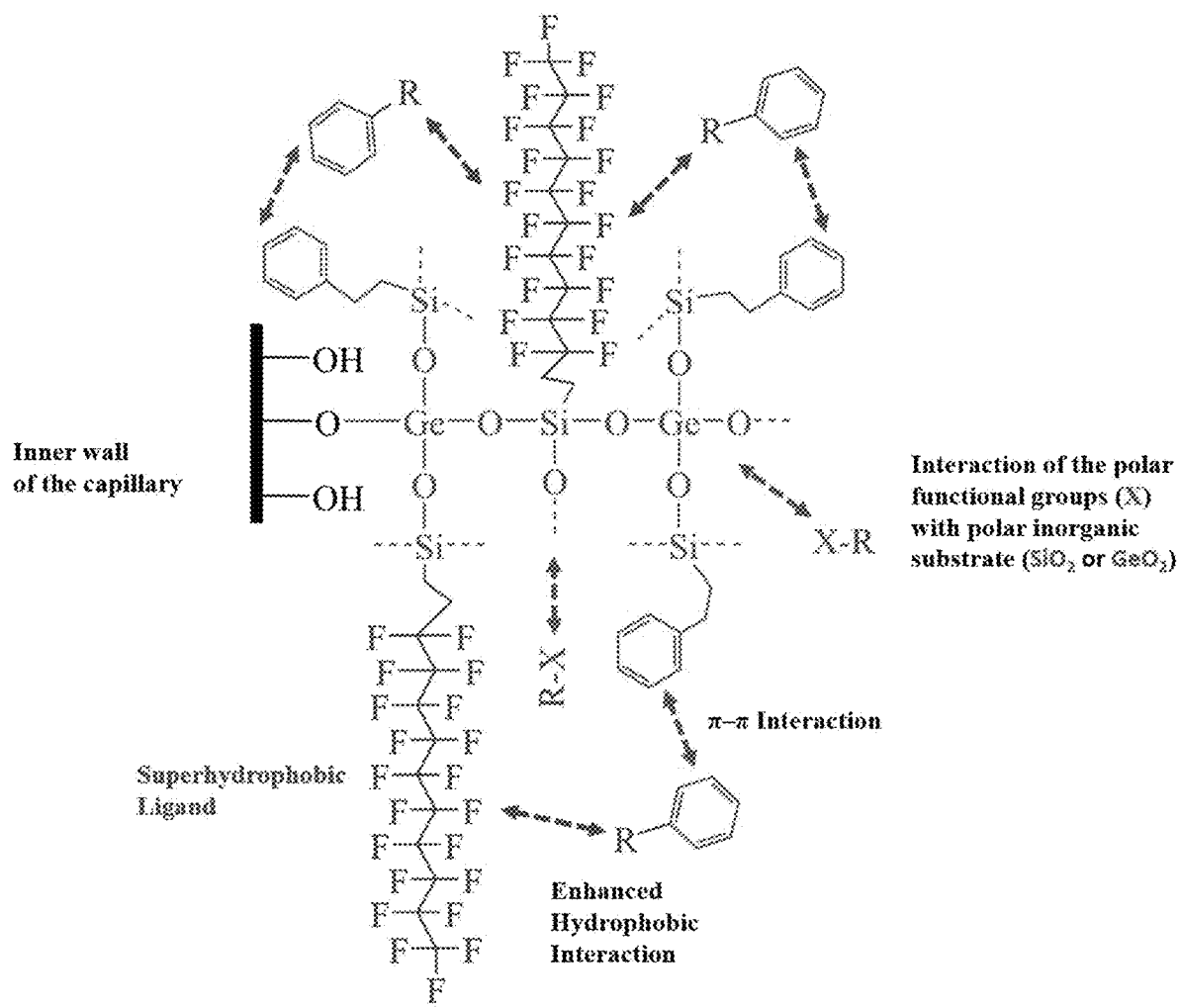
FIG. 2 is a representation of the process used to form the sol-gel coating within the capillary.

During the preparation of sol-gel coatings, precursor molecules had the appropriate chemical environment to undergo hydrolytic polycondensation reactions. In the context of the present work, the sol-gel reactions took place inside the fused silica capillary and the gelation was occurring in the presence of the silanol groups on the fused silica capillary inner surface. Patches of the three dimensional sol-gel network evolving in the vicinity of the capillary walls had the opportunity to get covalently bonded to the hydroxyl groups on the wall, resulting in a sol-gel coating chemically anchored to the fused silica capillary inner surface. A simplified representation of the above-mentioned hydrolytic polycondensation reactions is provided in the reaction scheme of FIG. 1. A representation of the process used to form the sol-gel coating within the capillary is shown in FIG. 2.

FTIR data was obtained for silica- and germania-based dual-ligand sol-gel sorbents (FIG. 3a, 3b). In the FTIR spectrum for the germania-based dual-ligand sol-gel sorbent (FIG. 3b), the characteristic peak at 960.3 $cm^{-1}$ may be attributed to Ge—O—Si bonds which is in agreement with the literature data. (K. Alhooshani, T.-Y. Kim, A. Kabir, A. Malik, Sol-gel approach to in situ creation of high pH-resistant surface-bonded organic-inorganic hybrid zirconia coating for capillary microextraction (in-tube SPME), J. Chromatogr. A, 1062 (2005) 1-14; H. Bagheri, H. Piri-Moghadam, P. Bayat, S. Balalaie, Application of sol-gel based molecularly imprinted xerogel for on-line capillary microextraction of fentanyl from urine and plasma samples, Anal. Methods, 5 (2013) 7096-7101). This characteristic peak is absent in the FTIR spectrum of the silica-based counterpart (FIG. 3a). This data demonstrates successful creation of the germania-based dual-ligand sol-gel sorbent. The $CF_2$— groups were present in both silica- and germania-based dual-ligand sol-gel coatings since the $CF_2$— moiety constitutes an essential building block for one of the organic ligands (PF-$C_{12}$) used to create both of these dual-ligand sorbents. The $CF_2$-groups provide a characteristic IR peak at ~1200 $cm^{-1}$. (X. Wang, H. Harris, K. Bouldin, H. Temkin, S. Gangopadhyay, M. Strathman, M. West, Structural properties of fluorinated amorphous carbon films, J. Appl. Phys., 87 (2000) 621-623). The presence of FTIR peaks at 1184.0 $cm^{-1}$ and 1192.03 $cm^{-1}$ in the spectra for silica- and germania-based dual-ligand sol-gel sorbents, respectively, indicates the presence of perfluoroalkyl moieties in both of the prepared sol-gel sorbents. The incorporation of phenyl group in the created sorbents is confirmed by the presence of IR stretches at the following wave numbers: 3028.4 $cm^{-1}$, 2968.5 $cm^{-1}$, and 696.6 $cm^{-1}$ (for the germania-based sol-gel sorbent) and 3024.4 $cm^{-1}$, 2970.1 $cm^{-1}$, and 701.5 $cm^{-1}$ (for the silica-based sol-gel sorbent). This experimentally found IR data is in agreement with the literature values (3028 $cm^{-1}$, 2971 $cm^{-1}$, and 696 $cm^{-1}$). (D. L. Ou, A. B. Seddon, Near- and mid-infrared spectroscopy of sol-gel derived ormosils: vinyl and phenyl silicates, J. Non-Cryst. Solids, 210 (1997) 187-203). Together, this IR data confirms the synthesis of dual-ligand sol-gel sorbents—both silica-based and germania-based.

The SEM images of the dual-ligand containing germania-based sol-gel sorbent coating (FIG. 4a) represent a cross-sectional view of a fused silica capillary containing sol-gel sorbent coated on the inner surface. FIG. 4b shows the thickness of the sol-gel coating to be approximately 2.2 μm.

To observe the elemental mapping of the silica- and germania-based dual ligand sol-gel sorbents, energy dispersive x-ray spectroscopy (EDS) experiments were conducted and the data is presented in FIGS. 5a and 5b. In the spectrum of the germania-based sol-gel sorbent (FIG. 5b) a distinct Ge peak was observed, in the silica-based sorbent such peak was absent. Additionally, in the germania-based system, ~4.9% germanium, ~3.6% silicon elements and in the silica-based sol-gel sorbent with dual ligands, ~10.5% of silicon element was observed. Carbon element amount was ~62.7% in silica-based dual ligand sol-gel sorbent, however germania-based system contained 71.4% carbon which is higher than the silica-based system.

Evaluation of the Sol-Gel Coatings in Capillary Microextraction

Analyte Extraction Profile for the Sol-Gel Coated CME Capillaries

In CME, extraction is continued until an analyte sorption-desorption equilibrium is established between the sample matrix and the sol-gel coating (extraction medium). A representative extraction profile for dual ligand sol-gel sorbents is presented in FIG. 6. To determine the equilibration time, CME-GC experiments were carried out on a silica-based dual-ligand sol-gel sorbent (PF-$C_{12}$/PhE=1:1) using naphthalene, butylbenzene and n-decane as test solutes. Specifics on the CME-GC procedure are described in Bingham et al., herein incorporated by reference in its entirety. (S. Bigham, J. Medlar, A. Kabir, C. Shende, A. Alli, A. Malik, Sol-gel capillary microextraction, Anal. Chem., 74 (2002) 752-761). To briefly explain such procedure, a homemade gravity-fed dispenser contains the aqueous sample and lets the sample flow through the connected sol-gel coated capillary until the equilibrium is established. In desorption step, the coated capillary with the analytes is connected to the injector of the GC, and the extracted analytes are thermally desorbed and sent into the chromatographic column and ultimately to the detector.

Figure 6:
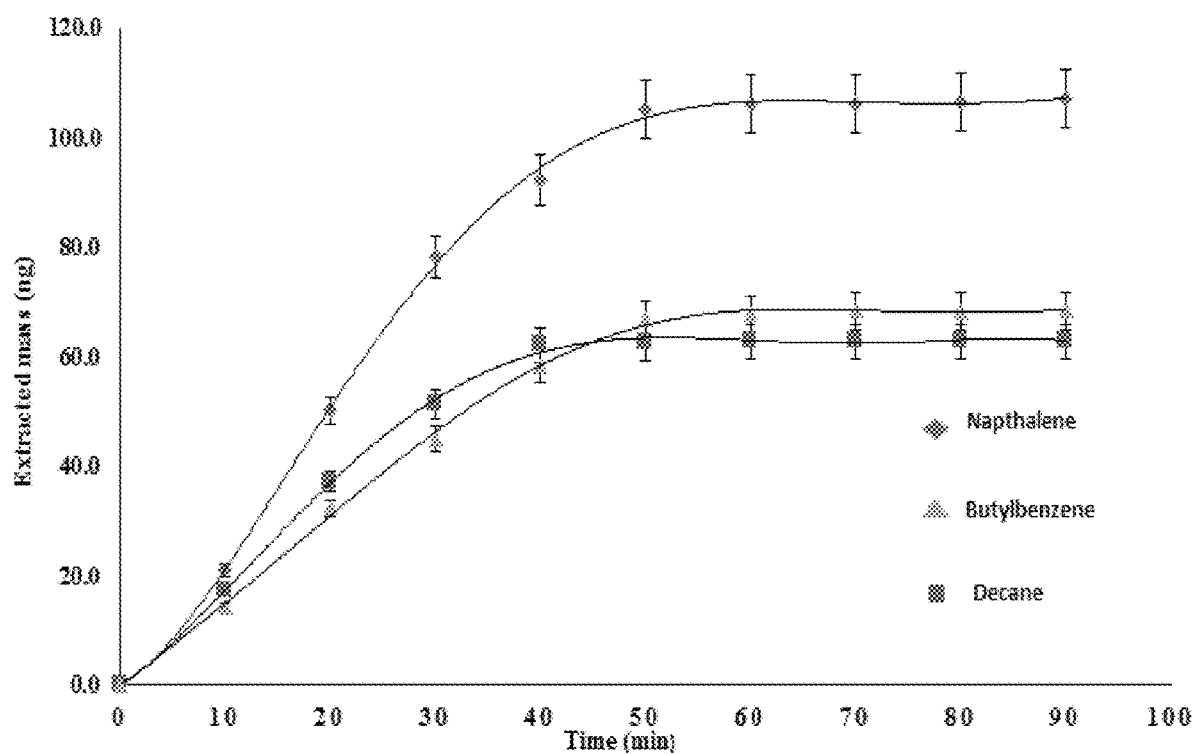
FIG. 6 is an image depicting the extraction profile of PF-$C_{12}$/PhE=1:1 $SiO_2$ sol-gel coating. CME-GC Conditions: Analytes were extracted individually by three times for each time interval with 10 cm×0.25 mm I.D. Sol-gel PF-$C_{12}$/PhE=1:1 $SiO_2$ coated capillaries. The concentrations of the analytes were 100 µg $L^{-1}$ for naphthalene, 75 µg $L^{-1}$ for decane, 50 µg $L^{-1}$ for butylbenzene. GC conditions: 30 m×0.25 mm I.D. Restek Rtx-35 MS Crossbond 35% diphenyl/65% dimethylpolysiloxane. GC run 25° C.-300° C. (rate: 25° C. $min^{-1}$), nitrogen carrier gas, injector 300° C., FID 350° C. and splitless desorption.

The analyte peak areas were first converted into analyte mass using a calibration plot. The extracted mass of the analyte was plotted against extraction time to construct the extraction profile (FIG. 6). The extraction time corresponding to the onset of the plateau on the graph represented the equilibrium time. As seen in FIG. 6, it took ~50 min for the analytes to reach equilibrium; therefore, in further experimentation, the extraction times for all the analytes were kept at 60 min to ensure that extraction equilibrium has been reached.

Capillary-to-Capillary and Run-to-Run Reproducibility Tests of the Sorbents

Reproducibility of the sol-gel coating procedure was evaluated by using five batches of CME capillaries coated with dual-ligand silica-based sol-gel sorbents (PF-$C_{12}$/PhE=1:1). With each sol-gel coated capillary, five replicate CME-GC experiments were performed using butylbenzene as the test analyte. The calculated GC peak area RSD value was found to be 2.1%. Such a small RSD value is indicative of excellent reproducibility of the used sol-gel coating procedure. It is worth mentioning that the capillary-to-capillary RSD value obtained in this study for sol-gel CME compares favorably with the typical 4% capillary-to-capillary RSD highlighted in a recent review as a remarkable reproducibility for CME. (A. Amiri, Solid-phase microextraction-based sol-gel technique, Trac-Trend Anal. Chem., 75 (2016) 57-74).

Run-to-run RSD values for each of the prepared sol-gel coatings were evaluated using GC peak areas obtained in five replicate CME-GC experiments whereby each test analyte was microextracted individually on the sol-gel coating under evaluation. For the evaluated sol-gel coatings, run-to-run RSD % values ranged from 0.9% to 2.7% (Table 1). Run-to-run RSD values were also calculated by using the peak areas obtained (n=5) from mixture chromatograms instead of individual analytes. It was noticed that while silica-based dual ligand containing sol-gel sorbent provided RSD values of 1.8% to 2.6% based on individual analyte extractions (Table 1), for the same set of analytes, RSD values of 2.8% to 3.9% were obtained based on the peaks obtained from mixture chromatograms. For a sample preparation technique (CME), these small RSD values are indicative of excellent repeatability provided by the CME methodology used in this study. Again, these RSD values favorably compare with literature data for CME-GC or fiber SPME-GC. (A. Kabir, K. G. Furton, A. Malik, Innovations in sol-gel microextraction phases for solvent-free sample preparation in analytical chemistry, Trac-Trend Anal. Chem., 45 (2013) 197-218; V. Abbasi, A. Sarafraz-Yazdi, A. Amiri, H. Vatani, Determination of Aromatic Amines Using Solid-Phase Microextraction Based on an Ionic Liquid-Mediated Sol-Gel Technique, J. Chromatogr. Sci., 54 (2016) 677-681; A. Amiri, F. Ghaemi, Thermally stable carbon nanofibers functionalized with poly (dimethylsiloxane) for solid-phase microextraction of polycyclic aromatic hydrocarbons prior to GC analysis, Microchim. Acta, (2016) 1-8).

TABLE 1

Run-to-run CME-GC peak area repeatability and detection limit data for the prepared dual-ligand silica ($SiO_2$)- and germania ($GeO_2$)-based sol-gel coatings with different molar ratios of the organic ligands (PF-$C_{12}$/PhE)

| | Ratio of the two ligands and nature of the inorganic substrate of the dual-ligand sol-gel sorbent | | | | | | | |
|---|---|---|---|---|---|---|---|---|
| | PF-$C_{12}$/PhE (1:1) ($SiO_2$) | | PF-$C_{12}$/PhE (1:2) ($GeO_2$) | | PF-$C_{12}$/PhE (2:1) ($SiO_3$) | | PF-$C_{12}$/PhE (2:1) ($SiO_2$) | |
| Test Probe | RSD % | LOD (ng $L^{-1}$) | RSD % | LOD (ng $L^{-1}$) | RSD % | LOD (ng $L^{-1}$) | RSD % | LOD (ng $L^{-1}$) |
| Octane | 1.8 | 23.1 | 1.9 | 12.9 | 1.8 | 26.3 | 1.8 | 17.6 |
| Nonane | 2.0 | 19.4 | 2.0 | 11.7 | 2.1 | 21.4 | 2.0 | 15.3 |
| Decane | 2.0 | 16.1 | 1.9 | 10.4 | 1.8 | 20.1 | 1.9 | 12.7 |
| Undecane | 2.2 | 13.3 | 2.3 | 9.2 | 1.3 | 15.7 | 1.4 | 10.2 |
| Dodecane | 1.9 | 9.5 | 1.5 | 8.2 | 1.5 | 12.6 | 1.2 | 7.1 |
| Tridecane | 1.9 | 6.7 | 0.9 | 6.5 | 1.0 | 8.6 | 1.3 | 4.2 |
| Propylbenzene | 2.4 | 7.1 | 2.7 | 6.3 | 2.6 | 8.8 | 2.3 | 12.3 |
| Butylbenzene | 2.1 | 6.1 | 2.2 | 5.4 | 2.1 | 7.5 | 2.1 | 8.0 |
| Butylcyclohexane | 2.6 | 6.9 | 2.4 | 6.2 | 1.7 | 9.1 | 1.9 | 11.2 |
| Naphthalene | 2.1 | 7.2 | 2.4 | 6.7 | 2.3 | 6.4 | 2.5 | 9.4 |

Specific Extraction (SE) as a Parameter to Compare of CME-GC Performances of the Prepared Sol-Gel Coatings Chromatographic peak areas obtained from SPME-GC experiments have often been used in literature to characterize the extraction performance of the SPME sorbents. (A. Sarafraz-Yazdi, Z. Es'haghi, S. Sepehr, Comparative study of the three sol-gel based solid phase microextraction fibers in extraction of BTEX from water samples using gas chromatography-flame ionization detection, Anal. Methods, 2 (2010) 746-752; A. L. Lopes, F. Augusto, Preparation and characterization of polydimethylsiloxane/poly(vinylalcohol) coated solid phase microextraction fibers using sol-gel technology, J. Chromatogr. A, 1056 (2004) 13-19; H. Bagheri, H. Piri-Moghadam, P. Bayat, S. Balalaie, Application of sol-gel based molecularly imprinted xerogel for on-line capillary microextraction of fentanyl from urine and plasma samples, Anal. Methods, 5 (2013) 7096-7101). However, the compositional and structural aspects of sorbents must be taken into consideration in characterizing sorbent performance. A larger peak area may not necessarily mean a better sorbent performance. Although the sol-gel method used for the fabrication of CME capillaries is capable of providing remarkable capillary-to-capillary reproducibility, it is quite natural to expect some variation in the sorbent loading in the prepared capillaries. The capillary-to-capillary variation of sorbent loading is reflected in the chromatographic peak areas obtained from the extracted analyte after it gets transferred to the chromatographic column. Therefore, peak area alone cannot serve as an objective measure of the extraction performance for a sorbent. In this study, the inventors used a normalized (with respect to sorbent mass) peak area value as a measure of extraction performance of s sorbent. The inventors have used the term specific extraction (SE) for this parameter and mathematically defined it through equation Eq. 1. For sorbents prepared by the same method (as in the case of the present study), other factors (that may influence the extracted amount) may be assumed to remain practically unchanged. In such systems, SE may serve as an objective measure of sorbent extraction performance.

Silica- and Germania-Based Dual-Ligand Sol-Gel Sorbents Created from Sol Solutions Containing Equimolar Concentration of the Precursors Two dual-ligand sol-gel coatings (one silica-based and the other germania-based) were prepared using equimolar concentration of the two sol-gel precursors carrying one of the two ligands (PF-$C_{12}$ or PhE). One of them used TEOG (a sol-gel precursor for $GeO_2$) and the other used TMOS (a sol-gel precursor for $SiO_2$) as co-precursors in the sol solutions.

In CME-GC experiments using aliphatic hydrocarbons as test solutes, silica-based sol-gel coating provided higher LOD values (6.7 ng $L^{-1}$ to 23.1 ng $L^{-1}$) than the germania-based sol-gel coating (LOD values ranging 6.5- to 12.9 ng $L^{-1}$) (Table 2). A comparison of these CME performance data for aliphatic hydrocarbon analytes revealed that germania-based sol-gel coating provided average of ~13.1% higher SE values compared with its silica-based counterpart (FIG. 7).

Figure 7:
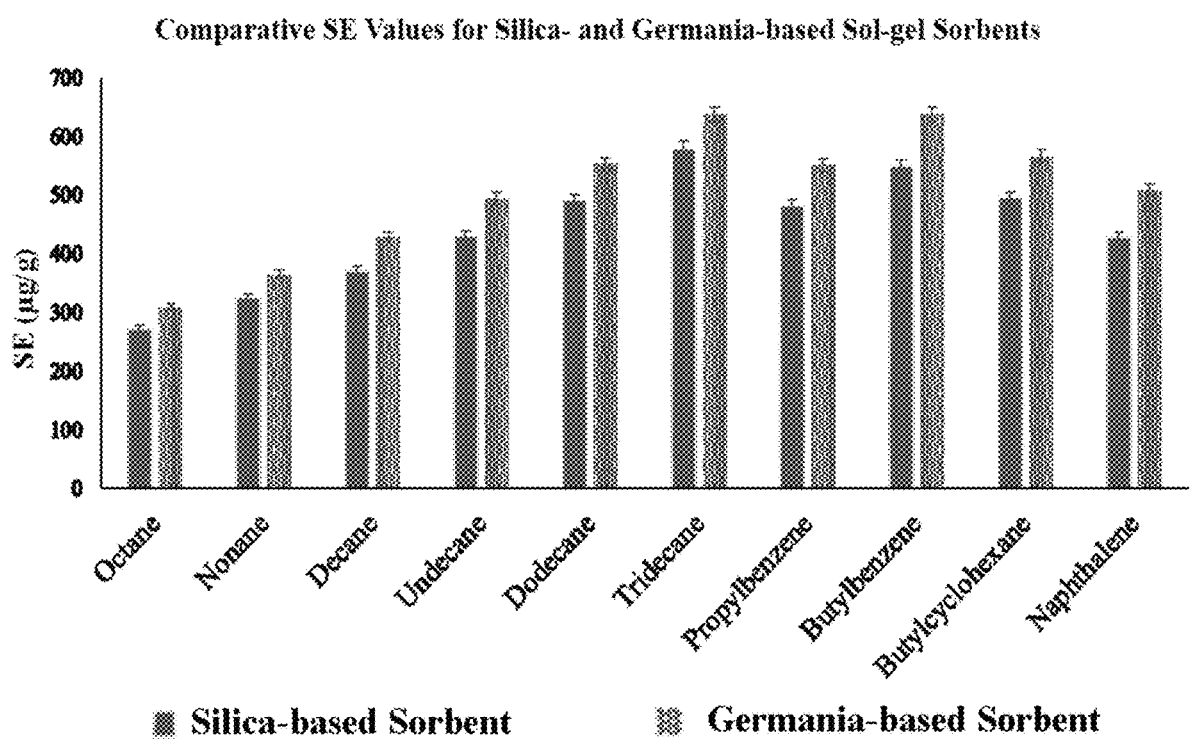
FIG. 7 is an image depicting SE comparison of silica- and germania-based sol-gel coatings. CME-GC Conditions: 10 cm×0.25 mm I.D. sol-gel PF-$C_{12}$/PhE=1:1 $SiO_2$ and PF-$C_{12}$/PhE=1:1 $GeO_2$ coated capillaries with extraction time of 60 min. GC column: 30 m×0.25 mm I.D. Restek Rtx-35 MS Crossbond 35% diphenyl/65% dimethylpolysiloxane. GC run 25° C.-300° C. (rate: 25° C. $min^{-1}$), nitrogen carrier gas, injector 300° C., FID 350° C., splitless desorption.

As seen in FIG. 7, germania-based PF-$C_{12}$/PhE=1:1 sorbent showed superior extraction performance for all of the used analytes. For example, for aliphatic hydrocarbons, the germania-based sorbents provided SE values that were 9.9%-15.2% higher than the corresponding SE values for silica-based PF-$C_{12}$/PE=1:1 sorbent. Similar increase in the SE values from silica- to germania-based system was observed in CME of alkylbenzenes (~15.4%), naphthalene (~18.9%) and butylcyclohexane (~14.3%).

Figure 8:
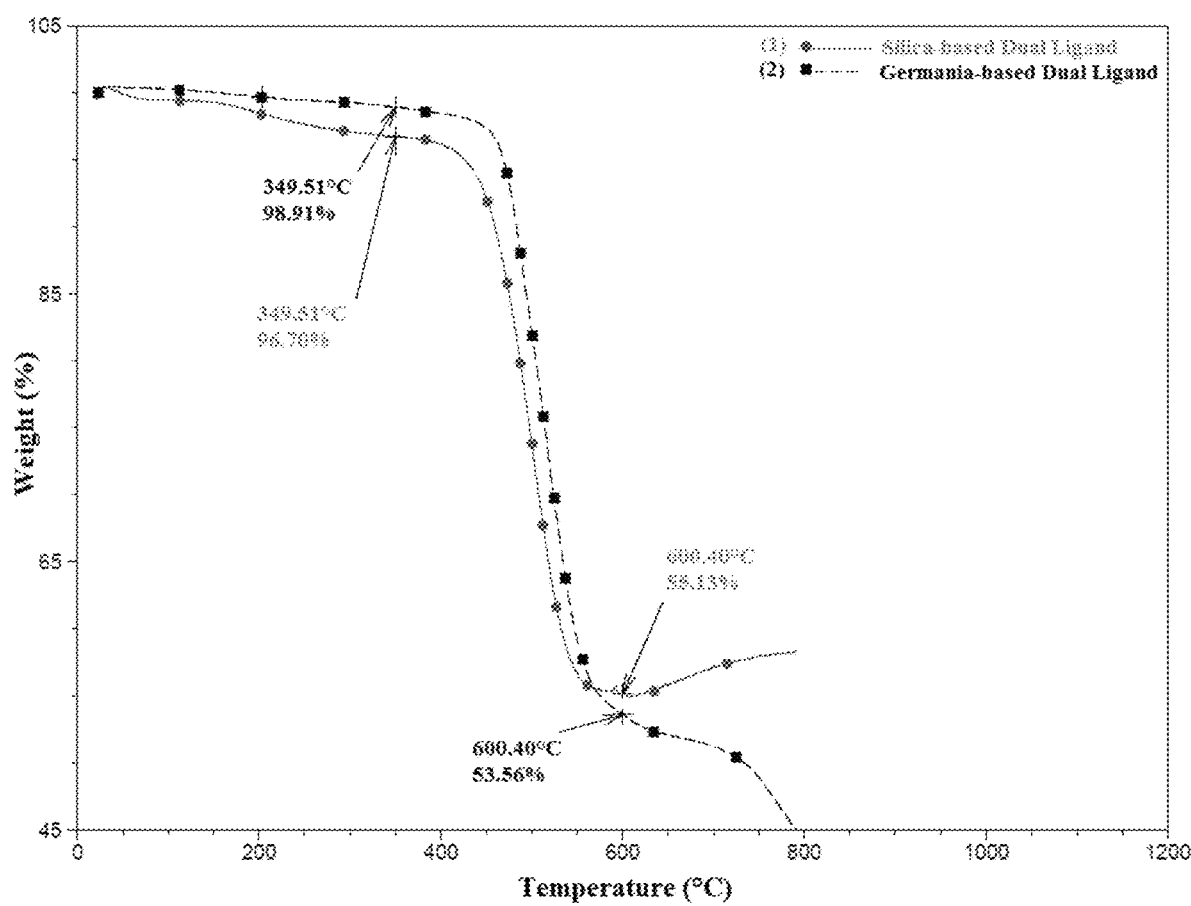
FIG. 8 is an image depicting thermogravimetric analysis (TGA) of equimolar concentration dual ligands containing $SiO_2$ and $GeO_2$ based sol-gel coatings. TGA System conditions: 50° C.-800° C. with a ramp rate of 20° C. $min^{-1}$.

In the compared sol-gel coatings, TMOS and TEOG were incorporated in the sol solutions as co-precursors and their molarity were kept equal. Here, the only variable was the type of the ligand-bearing co-precursor used in these sol solutions. Therefore, the obtained results illustrate the influence of inorganic component of the sol-gel sorbent (silica or germania) on microextraction performance. Superior microextraction performance of the germania-based dual-ligand sol-gel sorbent (PF-$C_{12}$/PhE=1:1-$GeO_2$) compared to its silica-based counterpart (PF-$C_{12}$/PhE=1:1-$GeO_2$) can be explained based on results from thermogravimetric analysis showing that the carbon loading in the germania-based sorbent is higher than that in the silica-based sorbent by ~4% (FIG. 8). EDS data in FIG. 8 also shows higher carbon loading in germania-based sol-gel sorbents. Higher carbon loading translates into a higher amount of ligands incorporated in the sol-gel coating which results in higher extracted amount of the analytes and thus superior microextraction performance.

A plausible explanation for higher amount of organic ligand bonded to germania-based sorbent could be the fact that the number of hydroxyl groups on germania-based material is significantly higher than that on silica-based counterpart, facilitating chemical anchoring of higher number of evolving sol-gel network patches (and hence organic ligands that are attached to these patches) to the fused silica surface. (V. Plotnichenko, V. Sokolov, V. Mashinsky, V. Sidorov, A. Guryanov, V. Khopin, E. Dianov, Hydroxyl groups in germania glass, J Non-Cryst. Solids, 296 (2001) 88-92). However, a 4% increase in carbon loading alone may not explain a 10-19% increase in SE. Therefore, it can be concluded that the overall increase in SE for the germania-based dual-ligand sol-gel coating reflects a combined effect of carbon loading and germania-bonded inorganic component of the sorbent.

The contributions of the two ligands in the microextraction were explored using propylbenzene and butylbenzene as test probes. Since these molecules contain a hydrophobic alkyl chain and an aromatic ring simultaneously, dual-ligand sol-gel sorbents were expected to provide efficient extraction for such analytes by combining two intrinsic properties of the used ligands: (a) the ability of the fluoroalkyl ligand to provide exceptionally high hydrophobic interaction and (b) the ability of the aromatic rings to provide $\pi$-$\pi$ interaction with the analytes. The experimental data supported this notion. As can be seen in Table 2, the LOD values obtained with silica- and germania-based coatings with butylbenzene were 6.1- and 5.4 ng $L^{-1}$, respectively. These values are lower than the LODs for most of the aliphatic hydrocarbons (ranging 6.5-23.1 ng $L^{-1}$) with both coatings and the reason for that could be the lack of aromatic groups in the aliphatic hydrocarbons and their inability to provide $\pi$-$\pi$ interaction.

SE values for butylbenzene (a ten-carbon molecule containing an aliphatic chain and an aromatic ring) obtained on silica- and germania-based dual-ligand (PF-$C_{12}$/PhE=1:1) sol-gel sorbents were significantly higher than the SE values for n-decane or butylcyclohexane representing two ten-carbon hydrocarbon molecules that have an aliphatic chain but each lack an aromatic ring. For butylbenzene used as test solute, the numerical comparison of the SE values is as follows: SE=548.6 µg $g^{-1}$ for the silica-based sorbent and SE=638.5 µg $g^{-1}$ for the germania-based sorbent (Table 2). For n-decane and butylcylohexane used as the test solutes, the SE values on the silica-based sorbent were: 374.1 µg $g^{-1}$ for n-decane and 495.2 µg $g^{-1}$ for butylcyclohexane; and for the germania-based sorbent corresponding values were 427.8- and 566.2 µg $g^{-1}$, respectively.

Butylcyclohexane has a chemical structure somewhat similar to butylbenzene; however, like n-decane, it lacks an aromatic ring—a factor responsible for its lower SE value than butylbenzene (495.2- vs. 566.2 µg g$^{-1}$). A similar trend was also observed in the extraction of naphthalene. When compared with other ten-carbon analytes (butylbenzene and butylcyclohexane), naphthalene provided lower SE values than both of those analytes. These results clearly show that presence the dual ligands in the sol-gel coatings yield higher microextraction efficiencies for structurally relevant analytes. CME-GC chromatograms obtained from these coatings are presented in FIG. 9.

Sol-Gel Sorbents Prepared with Non-Equimolar Concentrations of the Precursors

Besides the sorbents prepared from sol solutions with equimolar precursor concentrations of the precursors, dual-ligand sol-gel sorbents were also prepared using sol solutions with non-equimolar concentration ratios of the ligand-bearing precursors. The CME performance of two such silica-based sol-gel coatings were investigated: one prepared from a sol solution with PF-C$_{12}$/PhE=2:1 and the other using a sol solution where PF-C$_{12}$ to PhE ratio was 1:2.

The performance difference between the sol-gel coatings was only due to the precursor concentration difference since presumably it was the only parameter that varied between the two sorbents. As can be seen in Table 2, for aliphatic hydrocarbons, the ranges for SE values were 253.2-532.9 µg g$^{-1}$ for PF-C$_{12}$/PhE=1:2 coating, 272.0-580.4 µg g$^{-1}$ for the PF-C$_{12}$/PhE=1:1 coating, and 307.8- to 652.3 µg g$^{-1}$ for the PF-C$_{12}$/PhE=2:1 sol-gel coating. This trend indicates that when the amount of the sol-gel precursor containing highly hydrophobic PF-C$_{12}$ ligand is increased in the sol solution (leading to a corresponding increase in the hydrophobicity of the created coating), the SE values of hydrophobic solutes like aliphatic hydrocarbons also increase. A comparison of the CME performance data (Table 2) for the above two sol-gel coatings with that for PF-C$_{12}$/PhE=1:1 sol-gel sorbent reveals the following: when the PF-C$_{12}$ is doubled in the sol solution (corresponding to sorbent PF-C$_{12}$/PhE=2:1) the average increase in the SE values for aliphatic hydrocarbons was 11.4%; but when the PhE concentration is doubled (which corresponds to the sorbent PF-C$_{12}$/PhE=1:2), the average decrease in the SE values for the same analytes was 12.6%. These results may be explained based on stronger hydrophobic interaction provided by the perfluorinated ligand. Chromatograms showing CME-GC analysis results for a mixture of aliphatic and aromatic hydrocarbons extracted with the above-mentioned sorbents are presented in FIG. 7. The SE values for the extracted analytes can be found in Table 2.

The SE values for propylbenzene and butylbenzene were higher with the PF-C$_{12}$/PhE=1:2 sorbent (SE: 446.9- and 497.3 µg g$^{-1}$, respectively) than the PF-C$_{12}$/PhE=2:1 sorbent (SE: 404.3- and 441.6 µg g$^{-1}$, respectively). Such results could mean that in the microextraction of the alkylbenzenes, the π-π interaction plays a more important role than the hydrophobic interactions. However as can be seen in Table 2, all these values are lower than corresponding values for the PF-C$_{12}$/PhE=1:1 sorbent (SE: 481.4- and 548.6 µg g$^{-1}$, respectively). Such results could mean that in the microextraction of the alkylbenzenes, the π-π interaction plays a more important than the hydrophobic interactions. Because of this, simply increasing the molar concentration of the aromatic ligand-containing precursor increased the extraction efficiency of the alkylbenzenes. It should be noted that in these sol-gel coatings, total ligand amount remained constant, only organic ligand ratios varied. Considering the fact that such analytes have both aliphatic chain and a phenyl-group in their chemical structure, it could be expected that a coating with equimolar ligand concentration would provide higher microextraction performance than the sol-gel coatings with non-equimolar organic ligand concentrations.

Among all three types of coatings PF-C$_{12}$/PhE=1:2 sorbent provided the highest SE values for naphthalene: ~28.6% higher than PF-C$_{12}$/PhE=2:1 coating and ~6.2% higher than PF-C$_{12}$/PhE=1:1 coating. Such performance was expected because naphthalene has two fused aromatic rings which, due to π-π interaction, show greater affinity for the sol-gel sorbent with higher proportion of phenyl groups.

TABLE 2

Specific Extraction (SE) data for dual-ligand silica-based sol-gel CME coatings prepared with varied precursor concentrations in sol solutions
Concentration ratio of the two ligands in the sol solution

| Test Probe | GeO$_2$ | SiO$_2$ | | |
|---|---|---|---|---|
| | PF-C$_{12}$/PhE (1:1) | PF-C$_{12}$/PhE (1:1) | PF-C$_{12}$/PhE (1:2) | PF-C$_{12}$/PhE (2:1) |
| Octane | 309.3 | 272.0 | 253.2 | 307.8 |
| Nonane | 364.4 | 324.1 | 287.5 | 354.3 |
| Decane | 427.8 | 371.4 | 321.2 | 396.1 |
| Undecane | 493.6 | 430.7 | 382.4 | 482.8 |
| Dodecane | 553.0 | 491.2 | 415.7 | 562.9 |
| Tridecane | 638.0 | 580.4 | 532.9 | 652.3 |
| Propylbenzene | 550.5 | 481.4 | 446.9 | 404.3 |
| Butylbenzene | 638.5 | 548.6 | 497.3 | 441.6 |
| Butylcyclohexane | 565.2 | 495.2 | 359.9 | 306.1 |
| Naphthalene | 508.5 | 427.8 | 454.3 | 353.4 |

Dual-Ligand and Single-Ligand Sorbents Containing PF-C$_{12}$ and PhE

Microextraction performance of a dual-ligand silica-based sol-gel coating (PF-C$_{12}$/PhE=1:1) was also compared with that of single-ligand silica-based sol-gel coatings. For this, two single-ligand silica-based sol-gel coatings were used for comparison (one containing only PF-C$_{12}$- and the other only the PhE ligand) and were prepared using sol solutions having the same total ligand concentration as that in the sol solutions used to prepare dual-ligand sorbents. Chromatograms illustrating performances of these sorbents in CME-GC can be seen in FIG. 11.

TABLE 3

Specific Extraction (SE) values for silica-based
dual-ligand- and single-ligand sol-gel coating

| Test Probe | Dual-Ligand PF-$C_{12}$/PhE (1:1) | Single-Ligand PF-$C_{12}$ | Single-Ligand PhE |
|---|---|---|---|
| Octane | 272.0 | 320.4 | 202.6 |
| Nonane | 324.1 | 370.4 | 254.5 |
| Propylbenzene | 481.4 | 291.7 | 336.5 |
| Butylbenzene | 548.6. | 477.8 | 492.9 |
| Butylcyclohexane | 495.2 | 474.5 | 382.0 |
| Naphthalene | 427.8 | 469.4 | 561.8 |

It was observed that the aliphatic hydrocarbons were extracted more efficiently (~50.0% higher SE value) by the single-ligand PF-$C_{12}$ sol-gel coating than single-ligand PhE coating. It was logical to expect that the highly hydrophobic perfluorinated ligands would have higher affinity for hydrophobic nonpolar analytes like aliphatic hydrocarbons. The SE values obtained from the microextraction of octane and nonane by only PF-$C_{12}$-containing sorbents were 320.4- and 370.4 µg $g^{-1}$ respectively. By comparison, single-ligand sol-gel PhE sorbent provided SE values of 202.6- and 254.5 µg $g^{-1}$, respectively, for the same analytes (Table 3). In the case of equimolar dual-ligand sorbent (PF-$C_{12}$/PhE=1:1), the concentration of the highly hydrophobic PF-$C_{12}$-ligand was only half of the PF-$C_{12}$-ligand concentration in the single ligand PF-$C_{12}$-coating, and had a negative effect on the extraction of hydrophobic nonpolar analytes like aliphatic hydrocarbons. Addition of the less hydrophobic PhE-ligand in equivalent amount (which kept the total ligand concentration at a constant level for both single-ligand and double-ligand sorbents) was not enough to compensate for due loss in extraction power of the dual-ligand sorbent toward aliphatic hydrocarbons. This explains why the SE values for the dual-ligand sol-gel coating (PF-$C_{12}$/PhE=1:1) occupy an intermediate position.

In contrast, propylbenzene and butylbenzene were extracted more efficiently by single-ligand PhE-sorbent (SE: of 336.5- and 492.9 µg $g^{-1}$, respectively) than single-ligand sol-gel-PF-$C_{12}$ sorbent (SE: 291.7- and 477.8 µg $g^{-1}$, respectively). It should be added that such analytes were extracted most efficiently with dual-ligand (PF-$C_{12}$/PhE=1:1) sol-gel coatings where the obtained SE values were 481.4- and 548.6 µg $g^{-1}$, respectively. Considering the fact that alkylbenzenes contain both aliphatic chain and aromatic groups, both hydrophobic- and π-π interactions were operative in the microextraction process.

CME Performance of Dual Ligand Silica-Based Sol-Gel Sorbent in Extraction from Saline Matrix It is known that in some SPME applications, salting out is used to improve the sensitivity of an analytical method. (X. G. Yang, T. Peppard, Solid-phase microextraction for flavor analysis, J. Agric. Food Chem., 42 (1994) 1925-1930). In this work, the inventors have investigated the performance of a silica-based dual-ligand (PF-$C_{12}$/PhE=1:1) sol-gel sorbent in the extraction of octane, nonane, propylbenzene, butylcyclohexane, butylbenzene and naphthalene from fresh water as well as saline aqueous medium containing 599 mM NaCl. (B. Ramani, H. Zorn, J. Papenbrock, Quantification and fatty acid profiles of sulfolipids in two halophytes and a glycophyte grown under different salt concentrations, Z. Naturforsch. C, 59 (2004) 835-842). Such experiment could also be considered as a mini simulation of extraction of organic pollutants from ocean water.

The improvement in the extraction efficiency after the salt addition is evident from FIG. 12 and can be explained by the decrease in the analyte solubility in aqueous saline matrix, leading to higher analyte sorption by the sol-gel coating. (L. Lan, B. Hu, C. Yu, pH-resistant titania hybrid organic-inorganic coating for stir bar sorptive extraction of drugs of abuse in urine samples followed by high performance liquid chromatography-ultraviolet visible detection, J. Chromatogr. A, 1217 (2010) 7003-7009).

Additionally, run-to-run peak area RSD % value for CME from saline water was reasonably small (4.8%, n=5) where RSD % value for CME from non-saline samples was 5.1% under same experimental conditions. This indicated that the presence of the salt in the solution did not cause any appreciable deterioration in the used sol-gel coating.

Extraction Behavior of the Dual Ligand Silica-Based Sol-Gel Sorbent Toward Moderately Polar Analytes In order to observe the CME performance of the dual-ligand sorbent toward other chemical classes and the effect of the structure of the target analyte in microextraction, a silica-based equimolar dual-ligand sorbent (PF-$C_{12}$/PhE=1:1) was utilized as an extraction medium and decanal, decanol and butyrophenone were extracted. To monitor the selectivity of the sol-gel sorbent toward above-mentioned analytes, a chromatogram obtained after CME of a mixture containing these probes with identical concentrations could be seen in FIG. 11.

Inorganic substrates (silica or germania) of the prepared sol-gel sorbents are highly polar and their contribution to the extraction of nonpolar, hydrophobic analytes (discussed above) may not be significant. However, in the case of polar/moderately polar analytes, these polar substrates are likely to play a significant role in the extraction process. To test the validity of this assumption, two dual-ligand sol-gel coatings (one silica-based and the other germania-based) were prepared using equimolar concentrations of the two ligands in their sol solutions. CME performance of these coatings were evaluated using decanal, decanol and butyrophenone serving as test solutes. Chemical structure of each of these three analytes incorporate a ten-carbon alkyl chain and a polar/moderately polar functional group. Therefore, it is logical to assume that extraction of these analytes will be governed not only by their hydrophobic and/or π-π interactions with the sorbent ligands but also by the interactions of their polar/moderately polar functional groups with the polar inorganic substrates of the sol-gel sorbents. Chromatograms representing CME-GC analysis of an aqueous sample containing these probes with identical concentrations (150 µg $L^{-1}$) is presented in FIG. 13 (a: silica-based sorbent; b: germania-based sorbent).

For the silica-based dual-ligand sol-gel sorbent, the obtained SE values for decanal, decanol and butyrophenone was 123.1-, 147.2- and 164.4 µg $g^{-1}$, respectively. Analogous SE values for the germania-based sol-gel sorbent were 144.4, 175.9, and 201.8, respectively. A comparison of these SE values reveals that compared to the silica-based sorbent, the germania-based sorbent provided significantly superior extraction performance (on average ~20% higher SE values) for these analytes. This enhanced extraction performance of the germania-based sorbent may be attributed to the higher polarity of germania compared to silica. However, as could be expected, these SE values were significantly lower than the aliphatic hydrocarbons or alkylbenzenes which were presented in Table 2. It is important to note that better extraction was obtained for butyrophenone although it possesses a lower polarity than decanol. This can be explained by the fact that butyrophenone is capable of providing hydrophobic and π-π interactions with the sorbent ligands, in addition to the above-mentioned interactions with the polar substrate. This could also be due to the presence of the short aliphatic chain and the phenyl group together in its chemical structure. While decanol and decanal was microextracted mainly by hydrophobic interaction due to the aliphatic chain, in the case of butyrophenone, π-π interaction also played a role in the microextraction. Considering all three analytes selected here contain ten carbons and only vary in the type of functional group, such comparison reveals that presence of a carbonyl- or hydroxyl group in the analyte structure significantly affects the performance of the dual-ligand containing sol-gel sorbents.

Materials and Methods

Equipment

CME-GC experiments were conducted using a Varian 3800 GC-FID system (Varian (merged with Agilent), Palo Alto, Calif., USA) using a Restek Rtx-35 GC column (Bellefonte, Pa., USA). ChromPerfect software version 3.5 for windows operating system (Justice Laboratory, Denville, N.J., USA) was used for online CME-GC data collection and processing. A Vortex-Genie 2 model vortex system (Fisher Scientific, Pittsburgh, Pa., USA) was used to mix the ingredients in sol solutions. Fourier Transform-Infrared (FTIR) spectra were obtained on a Perkin Elmer (Waltham, Mass., USA) UATR Spectrum 2 spectrometer. Thermogravimetric Analysis (TGA) was performed by using a Q50 thermogravimetric analyzer from TA Instruments (New Castle, Del., USA). A Thermo IEC Micromax 3590F microcentrifuge system (Needham Heights, Mass., USA) was employed to centrifuge the sol solutions to remove particulates (if any). Nanopure water (18 MΩ) was obtained from a US Filter Maxima (Elga, England) nanopure water system.

Chemicals and Materials

Fused silica capillary (0.25 mm I.D.) was purchased from Polymicro Technologies (Phoenix, Ariz., USA). Tetramethoxysilane (TMOS, 99%), tetraethoxygermane (TEOG, 99%), and phenethyltrimethoxysilane (PhE-TMOS, 95%) were obtained from Gelest (Morrisville, Pa., USA). The sol-gel precursor with a bonded perfluorinated alkyl ligand, 1H, 1H, 2H, 2H-perfluorododecyltrimethoxysilane (PF-$C_{12}$-TMOS, 98%), was purchased from Synquest (Alachua, Fla., USA). Trifluoroacetic acid (TFA), octane, nonane, decane, undecane, dodecane, tridecane and naphthalene (purity >99%) were purchased from Acros (Morris Planes, N.J., USA). Acetone, butylbenzene and butylcyclohexane (purity >99%) and propylbenzene (purity >98%), were purchased from Sigma-Aldrich (St. Louis, Mo., USA). Methanol, methylene chloride and sodium chloride (purity >99%), kimwipes, microcentrifuge tubes, scintillation vials and pipette tips were purchased from Fisher Scientific (Pittsburgh, Pa., USA).

Preparation of Sol-Gel Coated Capillaries

Preparation of Sol Solutions

All sol solutions were prepared in centrifuge vials under identical conditions following the same procedure. The sol solution ingredients are listed in Table 4. In each preparation, the two sol-gel precursors were first added to the vial and vortexed for 60 seconds. The co-precursor (TEOG—a sol-gel precursor for $GeO_2$ or TMOS—a sol-gel precursor for $SiO_2$) was then added and the mixture was vortexed again for 60 seconds. Finally, TFA (containing 2% water, v/v) was added to each vial and the solutions were vortexed one last time for 60 seconds. Each solution was further centrifuged at 14000 rpm and was visually checked if there was any precipitate. The top clear solution was carefully pipetted out to a new clean vial.

TABLE 4

Composition of the sol solutions used to prepare silica ($SiO_2$)- and germania ($GeO_2$)-based dual-ligand as well as single-ligand sol-gel coatings with different ratios of the organic ligands (PF-$C_{12}$ and PhE)

| | Ratio of the two ligands and the nature of the inorganic substrate of the created sol-gel sorbents | | | | | |
|---|---|---|---|---|---|---|
| | PF-$C_{12}$/PhE (1:1) $SiO_2$ | PF-$C_{12}$/PhE (1:1) $GeO_2$ | PF-$C_{12}$/PhE (1:2) $SiO_2$ | PF-$C_{12}$/PhE (2:1) $SiO_2$ | PF-$C_{12}$ $SiO_2$ | PhE $SiO_2$ |
| PF-$C_{12}$ Precursor (moles) | $1.05 \times 10^{-4}$ | $1.05 \times 10^{-4}$ | $0.70 \times 10^{-4}$ | $1.40 \times 10^{-4}$ | $2.10 \times 10^{-4}$ | — |
| PhE Precursor (moles) | $1.05 \times 10^{-4}$ | $1.05 \times 10^{-4}$ | $1.40 \times 10^{-4}$ | $0.70 \times 10^{-4}$ | — | $2.10 \times 10^{-4}$ |
| TFA (98%) (moles) | $1.64 \times 10^{-3}$ | $1.27 \times 10^{-3}$ | $1.49 \times 10^{-3}$ | $1.72 \times 10^{-3}$ | $1.27 \times 10^{-3}$ | $1.94 \times 10^{-3}$ |
| TMOS/TEOG (moles) | $4.02 \times 10^{-4}$ | $4.02 \times 10^{-4}$ | $4.02 \times 10^{-4}$ | $4.02 \times 10^{-4}$ | $4.02 \times 10^{-4}$ | $4.02 \times 10^{-4}$ |
| Total Volume (μL) | 255 | 255 | 255 | 255 | 255 | 255 |
| PF-$C_{12}$ Precursor Concentration (M) | 0.41 | 0.41 | 0.27 | 0.55 | 0.82 | — |
| PhE Precursor Concentration (M) | 0.41 | 0.41 | 0.55 | 0.27 | — | 0.82 |

Coating Fused Silica Capillaries

Prior to coating, fused silica capillaries were subjected to hydrothermal pretreatment to enhance the silanol concentration as well as uniformity of their distribution on the capillary inner surface. (J. D. Hayes, A. Malik, Sol-gel open tubular ODS columns with reversed eleotroosmotic flow for capillary electrochromatography, Anal. Chem., 73 (2001) 987-996). A 1 m segment of hydrothermally pretreated fused silica capillary was installed on a homemade filling/purging system with one of its ends submerged in the sol solution contained in a vial vertically placed on the floor of the air-tight filling/purging device. The capillary was filled with the sol solution by applying 5 psi nitrogen pressure to the sol solution. After a few drops of the sol solution dripped out of the fused silica capillary exit end, the flow was stopped by plugging the capillary exit end with a rubber septum. The pressure was kept constant and the system stayed under these conditions for 60 min. After this, the capillary end was unplugged, the vial was removed, and the purging system was sealed air-tight again using the bottom cap. The nitrogen pressure was then increased to 20 psi to purge the coated capillary with nitrogen flow for 90 min.

The capillary was then removed from the filling/purging device and placed in a GC oven to thermally condition under constant nitrogen purge (1 mL/min) by programming the oven temperature from 40° C. to 320° C. at 2° C./min and holding the temperature at 320° C. for 3 hours. The coated capillary was then sequentially rinsed with 2 mL each of methylene chloride, methanol and water. Following this, the coated capillary was placed in the GC oven again and conditioned under constant nitrogen purge at 1 mL/min with the temperature programmed from 40° C. to 250° C. at a rate of 4° C./min. This time the capillary was held at 250° C. for 45 min. The described procedure was strictly followed to prepare all the sol-gel coated fused silica capillaries.

A total of six sol-gel coated capillaries (four with dual-ligand- and two with single-ligand coatings) were prepared and evaluated in CME-GC. In two of the sol solutions used to prepare dual-ligand sorbents, the ligands were in equimolar ratio, (PF-$C_{12}$/PhE=1:1); one of them was silica-based, and the other one was germania-based. To investigate the effect of the organic ligand concentration in the sol solution (and hence in the sol-gel sorbent) on the sorbent performance, two silica-based coatings were prepared by using sol solutions containing 1:2 and 2:1 molar ratios of precursors (PF-$C_{12}$/PhE=1:2 and PF-$C_{12}$/PhE=2:1). Finally, to compare the performances of dual-ligand sol-gel sorbents with performances of their single-ligand counterparts, the inventors also prepared two other silica-based sorbents each which contained only one ligand, PF-$C_{12}$ or PhE. For this, appropriate mole amounts of the precursors were used in sol solutions to closely match the overall molar concentration of the ligand(s) in sol solutions used to prepare these two types of sol-gel coatings (single-ligand and double-ligand).

Capillary Microextraction Procedure

CME-GC procedure has been described by Bingham et al. and is hereby incorporated in its entirety into this disclosure. (S. Bigham, J. Medlar, A. Kabir, C. Shende, A. Alli, A. Malik, Sol-gel capillary microextraction, Anal. Chem., 74 (2002) 752-761). Briefly, an aqueous sample contained in a homemade gravity-fed dispenser is passed through the sol-gel coated capillary connected to the bottom of the vertically placed dispenser. In this process, the analytes are extracted by the sol-gel surface coating as the sample passes through. This process is continued until an extraction equilibrium is established. To transfer the extracted analytes to the GC column, the coated CME capillary containing the extracted analytes is connected to the GC injector so that ~8 cm of the capillary remains inside of the GC injection port and ~2 cm of the distal end of the capillary protrudes into the GC oven. This end of the CME capillary is connected to the GC column using a quartz press-fit connector. The extracted analytes are then thermally desorbed for 5 min by rapidly raising the injector temperature from 40° C. to 300° C., and the mobile phase transports them to the GC column for analysis.

Determination of Specific Extraction (SE)

To objectively compare the microextraction performance of the prepared sol-gel sorbents, the inventors used a new parameter, Specific Extraction (SE), defined as follows:

$$SE = \frac{\text{The extracted mass of the analyte (ng)}}{\text{Mass of the sol-gel coating (mg)}} \quad \text{(Eq. 1)}$$

SE represents the extracted mass of an analyte per unit mass of the sorbent. The mass of the sorbent was calculated by subtracting the weight of a clean, dry, uncoated fused silica capillary (1 m) from the weight of the same piece of capillary after it was coated and thoroughly dried.

The extracted mass of an analyte was obtained by from its mean chromatographic peak area (obtained from triplicate measurements performed in CME-GC experiments) and a calibration plot constructed by directly injecting standard solutions of the same analyte with precisely known concentrations. The conversion of chromatographic peak areas of the extracted analytes into extracted mass by using calibration plots was described in Alhendal. (A. Alhendal, S. Mengis, J. Matthews, A. Malik, Nonhydrolytic sol-gel approach to facile creation of surface-bonded zirconia organic-inorganic hybrid coatings for sample preparation. I. Capillary microextraction of catecholamine neurotransmitters, J. Chromatogr. A, 1468 (2016) 23-32)

CONCLUSION

Sol-gel technology was successfully used to create silica- and germania-based sol-gel sorbents containing two organic ligands: (a) a perfluoroalkyl ligand characterized by superhydrophobicity and (b) a phenethyl ligand capable of providing π-π interaction with the analytes. Thanks to its exceptionally high hydrophobicity, perfluoroalkyl ligand showed high affinity for hydrophobic nonpolar analytes like aliphatic hydrocarbons, while phenethyl ligand showed pronounced selectivity toward aromatic compounds. Selectivity of the created dual-ligand sorbents can be effectively fine-tuned by controlling the relative proportions of the two ligands in the sorbents. A closer look at extraction performances of dual-ligand sol-gel sorbents with different ligand ratios led to the conclusion that a dual-ligand sol-gel sorbent with equimolar concentration of the two ligands provided more efficient extraction of analytes that contained both aliphatic and aromatic structural features (e.g., alkylbenzenes).

Germania-based sol-gel sorbents provided more efficient extraction of the test analytes compared to their silica-based counterparts. The created sol-gel sorbents provided stable, consistent performance in the extraction of analytes from saline and non-saline aqueous matrices. Low ng $L^{-1}$ level detection limits and <3% RSD were achieved in CME-GC-FID experiments employing dual-ligand sol-gel extraction media. The germania-based sorbent exhibited higher carbon loading than the silica-based sorbent.

In spite of the fact that both of the used organic ligands were nonpolar, hydrophobic in nature, dual-ligand sol-gel sorbents provided better than expected extraction performance for polar/moderately polar analytes (aldehydes, ketones and alcohols) which may be indicative of the participation of the polar inorganic sol-gel substrate (silica or germania) in their extraction process. The dual-ligand sol-gel sorbents provided superhydrophobicity and π-π interaction which results in stable CME performance with saline water matrix.

Successful creation and application of sol-gel sorbents with dual ligands and detailed ligand-analyte interaction investigation is a very useful tool in designing both germania- and silica-based sol-gel sorbents with various combinations of ligands to enhance the selectivity of extraction media toward specific analytes. Additionally, germania-based sol-gel sorbents have the potential to provide exceptional pH stability both in acidic and basic environments. (S. S. Segro, J. Triplett, A. Malik, Sol-Gel Germania Triblock Polymer Coatings of Exceptional pH Stability in Capillary Microextraction Online-Coupled to High-Performance Liquid Chromatography, Anal. Chem., 82 (2010) 4107-4113; L. Fang, S. Kulkarni, K. Alhooshani, A. Malik, Germania-based, sol-gel hybrid organic-inorganic coatings for capillary microextraction and gas chromatography, Anal. Chem., 79 (2007) 9441-9451).

The disclosures of all publications cited above are expressly incorporated herein by reference, each in its entirety, to the same extent as if each were incorporated by reference individually.

It is also to be understood that the following claims are intended to cover all of the generic and specific features of the invention herein described, and all statements of the scope of the invention which, as a matter of language, might be said to fall there between.

What is claimed is:

1. A dual ligand sol-gel sorbent for use in solid phase microextraction (SPME) comprising:
    at least two sol-gel precursors wherein the sol-gel precursors are a perfluorododecyl (PF-$C_{12}$) ligand and a phenethyl ligand;
    an inorganic co-precursor; and
    a catalyst wherein the catalyst is trifluoroacetic acid (TFA);
    wherein the dual ligand sol-gel provides enhanced extraction capability for aliphatic hydrocarbons, aromatic hydrocarbons, and nonpolar derivatives thereof.

2. The sorbent of claim 1, wherein the inorganic co-precursor is a germania co-precursor or a silica co-precursor.

3. The sorbent of claim 2, wherein the silica co-precursor is TMOS.

4. The sorbent of claim 2, wherein the germania co-precursor is TEOG.

5. The sorbent of claim 4, wherein the ligands are in equimolar concentration.

6. A method of manufacturing a dual-ligand sol-gel sorbent for use in solid phase microextraction (SPME) comprising steps in the order of:
    adding at least two sol-gel precursors to a vial wherein the at least two sol-gel precursors are a perfluorododecyl (PF-$C_{12}$) ligand and a phenethyl ligand;
    adding an inorganic co-precursor to the vial; and
    adding a catalyst to the vial to form a solution wherein the catalyst is trifluoroacetic acid (TFA);
    wherein selectivity for an analyte in SPME can be controlled by adjusting a ratio of the at least two sol-gel precursors.

7. The method of claim 6, further comprising mixing the at least two sol-gel precursors after adding the at least two sol-gel precursors to the vial.

8. The method of claim 6, further comprising mixing the inorganic co-precursor with the at least two sol-gel precursors after adding the inorganic co-precursor to the vial.

9. The method of claim 6, further comprising mixing the solution after adding the catalyst.

10. The method of claim 6, wherein the inorganic co-precursor is a germania co-precursor or a silica co-precursor.

11. The method of claim 10, wherein the silica co-precursor is TMOS.

12. The method of claim 10, wherein the germania co-precursor is TEOG.

13. The method of claim 6, wherein the ligands are in equimolar concentration.

* * * * *